(12) United States Patent
Emura

(10) Patent No.: US 6,344,878 B1
(45) Date of Patent: Feb. 5, 2002

(54) TELEVISION PROGRAM RECORDING RESERVATION APPARATUS

(75) Inventor: Koichi Emura, Matsudo (JP)

(73) Assignee: Matsushita Electrical Industrial, Osaka (JP)

(*) Notice: Subject to any disclaimer, the term of this patent is extended or adjusted under 35 U.S.C. 154(b) by 0 days.

(21) Appl. No.: 09/262,744

(22) Filed: Mar. 5, 1999

(30) Foreign Application Priority Data

Mar. 6, 1998 (JP) ............................................. 10-055596

(51) Int. Cl.$^7$ ............................ H04N 11/00; H04N 5/91
(52) U.S. Cl. ...................... 348/460; 348/725; 386/83; 725/50; 725/55; 725/58
(58) Field of Search ................................ 348/460, 473, 348/474, 569, 570, 906, 5, 5.5, 725, 731; 386/83, 46; 725/37, 38, 39, 50, 55, 58; H04N 11/00, 5/91

(56) References Cited

U.S. PATENT DOCUMENTS

| 5,526,130 A | * | 6/1996 | Kim .............................. 348/468 |
| 5,532,754 A | * | 7/1996 | Young et al. ................. 348/569 |
| 5,661,526 A | * | 8/1997 | Hamamoto et al. ......... 348/569 |
| 5,801,787 A | * | 9/1998 | Schein et al. ................ 348/569 |
| 5,974,222 A | * | 10/1999 | Yuen et al. .................... 386/83 |

FOREIGN PATENT DOCUMENTS

| JP | 5-22673 | 1/1993 |
| JP | 5-54466 | 3/1993 |
| JP | 6-276501 | 9/1994 |
| JP | 7-21619 | 1/1995 |
| JP | 7-65437 | 3/1995 |
| JP | 9-44931 | 2/1997 |

\* cited by examiner

Primary Examiner—Michael Lee
(74) Attorney, Agent, or Firm—Israel Gopstein

(57) ABSTRACT

Television program schedule information is recorded, and a plurality of television program recording reservations previously input by a viewer are registered in a reservation storing unit as a plurality of registered television program recording reservations. When an input television program recording reservation for a desired television program newly input by the viewer overlaps with a specific registered television program recording reservation for a specific television program, the television program schedule information is searched for a rebroadcast television program having the same contents as those of the desired television program, and a rebroadcast television program recording reservation for the rebroadcast television program is produced on condition that the rebroadcast television program recording reservation does not overlap with any of the registered television program recording reservations, and the rebroadcast television program recording reservation is registered. Accordingly, the same contents as those of the desired television program and the contents of the specific television program can be reliably recorded according to the rebroadcast television program recording reservation and the specific registered television program recording reservation, so that the viewer can entertain the desired television program and the specific registered television program played-back.

23 Claims, 16 Drawing Sheets

TELEVISION PROGRAM RECORDING RESERVATION APPARATUS

BACKGROUND OF THE INVENTION

1. Field Of The Invention

The present invention relates to an apparatus of reserving the recording of a television program in a broadcasting system for video data, audio data and meta data.

2. Description Of The Related Art

In a conventional video tape recorder (VTR), a viewer looks for his favorite television program listed in a television program table of a news paper, recording reservation information such as a television channel, a broadcasting start time and a broadcasting finish time or a G code is input to the VTR, so that the television program is recorded during a broadcasting time.

Also, a digital television broadcasting has been recently developed, a satellite digital television broadcasting has been already started, and a digital terrestrial television broadcasting is expected to be started in the near future. Because television contents expressed by digital data are broadcasted in the digital television broadcasting, a data broadcasting and the broadcasting of television program schedule information (or electronic program information) are performed in addition to the broadcasting of video and audio data.

In case of the digital television broadcasting, because a large number of television programs are broadcasted on hundreds of television channels, it becomes difficult to watch or record a desired television program selected from a large number of television programs. Therefore, it is desired that television program schedule information is broadcasted with the contents of the television programs for a viewer to easily watch or record his favorite television program.

Also, in case of the multichannel digital television broadcasting, contents of each television program is repeatedly broadcasted, so that the television program does not correspond to a broadcasting time (a broadcasting start time and a broadcasting finish time). Therefore, it is desired that a viewer is not required to specify a broadcasting time of a television program but the time for recording a television program is automatically set when the viewer selects the television program.

Also, in cases where a special television program is suddenly added or a broadcasting duration of a television program is suddenly prolonged, the television program schedule information is renewed. In this case, it is expected that the renewed television program schedule information is broadcasted to each viewer and a recording schedule of his favorite television program is adaptively changed according to the renewed television program schedule information.

As Japanese patent applications of the digital television broadcasting using the television program schedule information, a group of Published Unexamined Japanese Patent Applications "System for Changing VTR Reserving Video Recording Automatically" (No.5-54466 of 1993), "Information Record Reservation Device and Reservation Method" (No.6-276501 of 1994), "Reserving Device for Automatic Video Recording of Program" (No.7-65437 of 1995) and "Television broadcasting Picture Recording System" (No.9-44931 of 1997) are disclosed. In these applications, the recording reservation is changed according to the renewal of the television program schedule information. Also, a Published Unexamined Japanese Patent Application "Video Recording Management Device" (No.7-21619 of 1995) is disclosed. In this application, when overlapping recording reservations are detected, one of the recording reservations is canceled or the recording reservation is treated as a reservation for another VTR. Also, a Published Unexamined Japanese Patent Application "TV Program Reservation Method and Television Receiver with TV Program Reservation Function" (No.5-22673 of 1993) is disclosed. In this application, television program schedule information (or broadcasting program table) is displayed on a cathode-ray tube display part to simplify a reservation input.

2.1. Previously Proposed Art:

FIG. 1 is a block diagram of a conventional television program recording reservation apparatus.

As shown in FIG. 1, a conventional television program recording reservation apparatus 100 is composed of a receiving unit 101 for receiving a broadcast signal S1;

a demultiplexing unit 102 for demultiplexing the broadcast signal S1 into a television program signal S2 and input television program schedule information I1$i$;

a television program schedule information storing unit 103 for storing television program schedule information I1 previously output from the demultiplexing unit 102;

a television program recording reservation receiving unit 104 for receiving input television program recording reservation information I2$i$ from a viewer;

a television program recording reservation information storing unit 105 for storing television program recording reservation information I2 previously received in the receiving unit 104;

a schedule managing unit 106 for managing the television program schedule information storing unit 103 to renew the television program schedule information I1 stored in the storing unit 103 according to the input television program schedule information I1$i$, and managing a schedule of the television program recording reservations to add the input television program recording reservation information I2$i$ to the television program schedule information I1 on condition that a recording time (from a recording start time to a recording finish time) of the input television program recording reservation information I2$i$ does not overlap with that of any television program schedule information I1;

a timer 107 for outputting an interruption signal S3 to the schedule managing unit 106; and a television program recording unit 108 for recording the television program signal S2 output from the demultiplexing unit 102 in a recording medium 109 under the control of the schedule managing unit 106.

FIG. 2 is a block diagram of the schedule managing unit 106.

As shown in FIG. 2, the schedule managing unit 106 is composed of a broadcast signal reception control unit 111 for controlling the reception of the broadcast signal S1 performed in the receiving unit 101 according to the interruption signal S3 output from the timer 107;

a television program schedule information comparing and renewing unit 112 for comparing the input television program schedule information I1$i$ output from the demultiplexing unit 102 with the television program schedule information I1 previously stored in the television program schedule information storing unit 103 and renewing the television program schedule information I1 to the input television program schedule information I1i output from the demultiplexing unit 102 in cases where the input television program schedule information I1i differs from the television program schedule information I1;

a television program recording reservation information comparing and renewing unit 113 for comparing the input television program recording reservation information I2i newly received in the receiving unit 104 with the television program recording reservation information I2 registered in the television program recording reservation information storing unit 105 and adding the input television program recording reservation information I2i to the television program recording reservation information I2 in cases where a recording time of the input television program recording reservation information I2i does not overlap with any recording time of the television program recording reservation information I2 already registered in the storing unit 105; and a television program recording control unit 114 for controlling the recording of the television program signal S2 performed in the television program recording unit 108.

In the above configuration, to periodically receive television program schedule information, the broadcast signal reception control unit 111 outputs a receiving unit control signal to the receiving unit 101 in synchronization with an interruption signal S3 output from the timer 107 at regular time periods, so that the receiving unit 101 is controlled to receive a broadcast signal S1 composed of a television program signal S2 and input television program schedule information I1i. Thereafter, the broadcast signal S1 received in the receiving unit 101 is demultiplexed into the television program signal S2 and the input television program schedule information I1i in the demultiplexing unit 102.

Thereafter, in the television program schedule information comparing and renewing unit 112, the input television program schedule information I1i newly received is compared with the television program schedule information I1 previously stored in the television program schedule information storing unit 103. In cases where the input television program schedule information I1i differs from the television program schedule information I1 previously stored, the television program schedule information I1i newly received is replaced with the television program schedule information I1 in the television program schedule information storing unit 103. Therefore, even though the television program schedule information I1 is renewed, updated television program schedule information I1i is stored in the television program schedule information storing unit 103.

Also, when a viewer inputs television program recording reservation information I2i for a desired television program to the television program recording reservation receiving unit 104, a broadcasting time (a broadcasting start time and a broadcasting finish time) and a broadcasting channel of the desired television program are retrieved from the television program schedule information I1 of the storing unit 103 and are attached to the input television program recording reservation information I2i as a recording time and a reservation channel, and it is judged in the television program recording reservation information comparing and renewing unit 113 whether or not the recording time of the input television program recording reservation information I2i overlaps with a recording time of one of recording reservations indicated by the television program recording reservation information I2 of the television program recording reservation information storing unit 105. In cases where the recording time of the input television program recording reservation information I2i does not overlap with any recording time of the television program recording reservation information I2 registered in the storing unit 105, the input television program recording reservation information I2i is additionally registered in the storing unit 105. In contrast, in cases where the recording time of the input television program recording reservation information I2i overlaps with one recording time of the television program recording reservation information I2 registered in the storing unit 105, an overlap informing instruction is output to the television program recording reservation receiving unit 104 to cancel one of overlapping television program recording reservations or treat the input television program recording reservation information I2i as a television program recording reservation input to another television program recording reservation apparatus (not shown).

Thereafter, a television program recording control signal is output from the recording control unit 114 to the television program recording unit 108 according to each television program recording reservation registered in the storing unit 105 to record the television program signal S2 transmitted from the demultiplexing unit 102 in the recording medium 109 during the recording time indicated by the television program recording reservation.

Next, an operation, in which a television program recording reservation is changed according to the renewal of the television program schedule information I1, is described.

FIG. 3A shows an example of a television program schedule table in which the recording of a specific television program is reserved, FIG. 3B shows an example of a renewed television program schedule table in which a recording time of the specific television program is changed.

As shown in FIG. 3A, a recording reservation is performed for a television program "drama" P1 planned to be broadcasted just after another television program "baseball game" P2. As shown in FIG. 3B, in cases where a broadcasting time of the television program "baseball game" P2 is prolonged by 30 minutes, the television program schedule information I1 is renewed, a recording time (a recording start time and a recording finish time) in the recording reservation is automatically delayed by 30 minutes according to the renewed television program schedule information I1 in the conventional television program recording reservation apparatus 100.

Next, an operation, in which a television program recording reservation is prohibited in case of the overlapping of the television program recording reservation with another television program recording reservation previously performed, is described.

FIG. 4 shows an example of a television program schedule table in which the recording of a first television program "movie" planned to be broadcasted during a broadcasting time on a first channel CH1 has been al ready reserved and a viewer tries to reserve the recording of a second television program "drama" planned to be broadcasted on a second channel CH2 during a broadcasting time overlapping with that of the first television program "movie".

As shown in FIG. 4, the recording of a first television program "movie" planned to be broadcasted during a broadcasting time (from 7:00 to 9:00) on a first channel CH1 is reserved. Also, the recording of a television program "comedy" planned to be broadcasted during a broadcasting time (from 9:00 to 11:00) on a second channel CH2 is reserved. In cases where a viewer tries to reserve the recording of a second television program "drama" planned to be broadcasted during a broadcasting time (from 7:30 to 8:30) on the second channel CH2, because the broadcasting time of the second television program "drama" overlaps with that of the first television program "movie", the recording reservation of the first television program "movie" takes priority of that of the second television program "drama", and the recording reservation of the second television program "drama" is prohibited.

Next, an operation, in which recording reservations for television programs broadcasted as a television series (or television programs broadcasted as a television serial) are performed, is described.

FIG. 5 shows an example of a television program schedule table in which a plurality of television programs planned to be broadcasted in the same prescribed broadcasting time are listed as a television series (or a television serial). As shown in FIG. 5, a first-time television program "drama (1)", a second-time television program "drama (2)" and a third-time television program "drama (3)" are broadcasted as a television serial, and the television program is broadcasted every day (or every week). In this case, a viewer reserves the recording of the first-time television program, the recording of the second-time television program and the recording of the third-time television program, respectively.

Next, an operation, in which recording reservations for a plurality of television programs suiting a taste of a viewer are performed, is described.

FIG. 6 shows an example of a television program schedule table in which a plurality of television programs suiting a taste of a viewer are listed.

As shown in FIG. 6, in cases where a viewer likes the Hawaii and a brand shopping, he looks for a television program "Hawaii" and a television program "brand shopping" and reserves the recording of the television program "Hawaii" and the recording of the television program "brand shopping". However, he often overlooks a television program "Honolulu". Therefore, he misses to reserve the recording of the television program "Honolulu".

2.2. Problems to be Solved by the Invention

In the recording reservation changing method disclosed in the Published Unexamined Japanese Patent Applications No.5-54466 of 1993, No.6-276501 of 1994, No.7-65437 of 1995 and No.9-44931 of 1997, in cases where a broadcasting time of a television program is changed because of the prolongation of the broadcasting duration or the insertion of a specific television program, a recording time (a recording start time and a recording finish time) of the recording reservation for the television program can be automatically reset at a real time according to the change of the broadcasting time. However, in cases where the reset recording time of the recording reservation overlaps with a recording time of another recording reservation already registered, there is a problem that one of the recording reservation cannot be registered.

Also, in the Published Unexamined Japanese Patent Application No.7-21619 of 1995, one of overlapping recording reservations is reset as a recording reservation performed in another VTR, so that a plurality of television programs, of which broadcasting times overlap with each other, can be simultaneously recorded in a plurality of VTRs. However, there is a problem that a plurality of television programs, of which broadcasting times overlap with each other, cannot be simultaneously recorded in a single VTR.

Also, in the Published Unexamined Japanese Patent Application No.5-22673 of 1993, when a television program desired to be recorded is selected from a plurality of television programs of a television program schedule table displayed on a display, the recording of the desired television program is automatically reserved, so that a television program reserving operation can be simplified. However, there is a problem that a lump-sum recording reservation for a plurality of television programs broadcasted as a television series (or a television serial) cannot be performed or an assist in reserving the recording of a favorite television program overlooked by a viewer cannot be performed.

SUMMARY OF THE INVENTION

A first object of the present invention is to provide, with due consideration to the problems of such a conventional television program recording reservation apparatus, a television program recording reservation apparatus in which a plurality of recording reservations for a plurality of television programs, of which a plurality of broadcasting times overlap with each other, are registered to record the television programs according to the recording reservations.

A second object of the present invention is to provide a television program recording reservation apparatus in which a lump-sum recording reservation for a plurality of specific television programs broadcasted as a television series (or a television serial) is automatically registered to record the specific television programs according to the lump-sum recording reservation and in which a recording reservation for one of the specific television programs is registered to selectively record the specific television program according to the recording reservation.

A third object of the present invention is to provide a television program recording reservation apparatus in which a recording reservation for a favorite television program suiting a viewer's taste is automatically registered.

The first object is achieved by the provision of a television program recording reservation apparatus, comprising:

television program schedule storing means for storing a television program schedule in which a broadcasting schedule of a plurality of television programs including a specific television program is listed, one or more television programs being rebroadcasted;

television program recording reservation receiving means for receiving an input television program recording reservation for a desired television program;

television program recording reservation storing means for storing one or more television program recording reservations for one or more television programs previously received by the television program recording reservation receiving means as one or more registered television program recording reservations;

television program recording reservation overlap judging means for judging whether or not a recording time of the input television program recording reservation received by the television program recording reservation receiving means overlaps with a recording time of each registered television program recording reservation registered in the television program recording reservation storing means;

rebroadcast television program retrieving means for retrieving a rebroadcast desired television program having the same contents as those of the desired television program or a rebroadcast specific television program having the same contents as those of the specific television program from the television program schedule stored in the television program schedule storing means, in cases where it is judged by the television program recording reservation overlap judging means that the recording time of the input television program recording reservation overlaps with a recording time of a specific registered television program recording reservation for the specific television program, on condition that a broadcasting time of the rebroadcast desired television program does not overlap with a recording time of any registered television program recording reservation registered in the television program recording reservation storing means or a broadcasting time of the rebroadcast specific television program does not overlap with a recording time of the input television program recording reservation or a recording time of any registered television program recording reservation other than the specific registered television program recording reservation, a recording time of a television program recording reservation for a television program being the same as a broadcasting time of the television program; and television program recording reservation registration controlling means for producing a rebroadcast television program recording reservation for the rebroadcast desired television program retrieved by the rebroadcast television program retrieving means or a rebroadcast television program recording reservation for the rebroadcast specific television program retrieved by the rebroadcast television program retrieving means according to the television program schedule stored in the television program schedule storing means, and controlling the television program recording reservation storing means to store the rebroadcast television program recording reservation for the rebroadcast desired television program or to store the rebroadcast television program recording reservation for the rebroadcast specific television program in place of the specific registered television program recording reservation for the specific television program, the rebroadcast desired television program or the rebroadcast specific television program being recorded at its broadcasting time and being played back.

In the above configuration, in cases where a recording time of an input television program recording reservation for a desired television program overlaps with that of one of the registered television program recording reservations, it is impossible to record the desired television program in its broadcasting time.

In the present invention, in cases where it is judged by the television program recording reservation overlap judging means that a recording time of a input television program recording reservation for a desired television program overlaps with a recording time of a specific registered television program recording reservation for a specific television program, because the desired television program and the specific television program are respectively rebroadcasted or repeatedly broadcasted, a rebroadcast desired television program or a rebroadcast specific television program is retrieved from the television program schedule.

In cases where the rebroadcast desired television program is retrieved on condition that a broadcasting time of the rebroadcast desired television program does not overlap with a recording time of any registered television program recording reservation, a rebroadcast television program recording reservation for the rebroadcast desired television program is produced, and the rebroadcast television program recording reservation is registered in the television program recording reservation storing means.

Also, in cases where the rebroadcast specific television program is retrieved on condition that a broadcasting time of the rebroadcast specific television program does not overlap with a recording time of the input television program recording reservation or a recording time of any registered television program recording reservation other than the specific registered television program recording reservation, a rebroadcast television program recording reservation for the rebroadcast specific television program is produced, and the rebroadcast television program recording reservation is registered in the television program recording reservation storing means in place of the specific registered television program recording reservation for the specific television program.

Accordingly, even though a television program recording reservation, of which a recording time overlaps with a specific registered television program recording reservation for a specific television program, is input, because the television program recording reservation for the desired television program is replaced with a rebroadcast television program recording reservation for a rebroadcast desired television program having the same contents as those of the desired television program on condition that the rebroadcast television program recording reservation does not overlap with any registered television program recording reservation or because the specific registered television program recording reservation is replaced with a rebroadcast television program recording reservation for a rebroadcast specific television program having the same contents as those of the specific television program on condition that the rebroadcast television program recording reservation does not overlap with the input television program recording reservation or any registered television program recording reservation other than the specific registered television program recording reservation, the desired television program and the specific registered television program can be reliably recorded and played back.

The first object is also achieved by the provision of a television program recording reservation apparatus, comprising:

television program schedule storing means for storing a television program schedule in which a broadcasting schedule of a plurality of television programs including first and second television programs is listed, one or more television programs being rebroadcasted;

television program recording reservation storing means for storing a plurality of television program recording reservations for a plurality of television programs;

television program recording reservation overlap judging means for judging whether or not a recording time of one television program recording reservation overlaps with a recording time of another television program recording reservation for each television program recording reservation registered in the television program recording reservation storing means;

rebroadcast television program retrieving means for retrieving a rebroadcast television program having the same contents as those of a first television program from the television program schedule stored in the television program schedule storing means, in cases where it is judged by the television program recording reservation overlap judging means that a recording time of a first television program recording reservation for the first television program overlaps with a recording time of a second television program recording reservation for a second television program, on condition that a broadcasting time of the rebroadcast television program does not overlap with a recording time of any of the television program recording reservations registered in the television program recording reservation storing means other than the first television program recording reservation, a recording time of a television program recording reservation for a television program being the same as a broadcasting time of the television program; and television program recording reservation producing means for producing a rebroadcast television program recording reservation for the rebroadcast television program retrieved by the rebroadcast television program retrieving means according to the television program schedule stored in the television program schedule storing means, and controlling the television program recording reservation storing means to store the rebroadcast television program recording reservation for the rebroadcast television program in place of the first television program recording reservation for the first television program, the rebroadcast television program being recorded at its broadcasting time and being played back.

In the above configuration, in cases where a broadcasting time of a specific television program broadcasted just before a first television program or a second television program is prolonged, a broadcasting time of the first television program or a broadcasting time of the second television program is delayed. Therefore, even though a first television program recording reservation for the first television program and a second television program recording reservation for the second television program not overlapping with each other are initially registered in the television program recording reservation storing means, when the broadcasting of the specific television program is prolonged, there is a case that the first television program recording reservation overlaps with the second television program recording reservation.

In this case, the overlapping of the first and second television program recording reservations is detected by the television program recording reservation overlap judging means, and a rebroadcast television program having the same contents as those of the first television program is retrieved from the television program schedule by the rebroadcast television program retrieving means on condition that a broadcasting time of the rebroadcast television program does not overlap with a recording time of any of the television program recording reservations other than the first television program recording reservation. Thereafter, a rebroadcast television program recording reservation for the rebroadcast television program is produced according to the television program schedule and is registered in the television program recording reservation storing means in place of the first television program recording reservation under the control of the television program recording reservation producing means.

Accordingly, even though the first television program recording reservation overlaps with the second television program recording reservation, because the rebroadcast television program recording reservation is registered in place of the first television program recording reservation, the contents of the first television program and the contents of the second television program can be reliably recorded according to the rebroadcast television program recording reservation and the second television program recording reservation, and the contents of the first television program and the contents of the second television program can be played back.

The second object is achieved by the provision of a television program recording reservation apparatus, comprising:

television program schedule storing means for storing a television program schedule in which a broadcasting schedule of a plurality of television programs is listed;

television program recording reservation receiving means for receiving an input television program recording reservation for a desired television program;

television program recording reservation storing means for storing one or more television program recording reservations for one or more television programs previously received by the television program recording reservation receiving means as one or more registered television program recording reservations;

television program judging means for judging according to the television program schedule stored in the television program schedule storing means whether or not the desired television program of the input television program recording reservation received by the television program recording reservation receiving means is one of a plurality of specific television programs planned to be broadcasted as a television series or a television serial;

television program series retrieving means for retrieving all the specific television programs of the television series or the television serial from the television program schedule stored in the television program schedule storing means in cases where it is judged by the television program judging means that the desired television program is one of the specific television programs; and television program recording reservation producing means for producing either a television program lump-sum recording reservation for all the specific television programs retrieved by the television program series retrieving means or a specific television program recording reservation for one specific television program different from the desired television program according to the television program schedule stored in the television program schedule storing means, and controlling the television program recording reservation storing means to store the television program lump-sum recording reservation or a set of the input television program recording reservation and the specific television program recording reservation, all the specific television programs or a set of the desired television program and the specific television program being recorded according to the television program lump-sum recording reservation or the set of the input television program recording reservation and being played back.

In the above configuration, a plurality of specific television programs planned to be broadcasted as a television series or a television serial are listed in the television program schedule. When a viewer inputs a television program recording reservation for a desired television program, it is judged by the television program judging means whether or not the desired television program of the input television program recording reservation is one of the specific television programs. In cases where the desired television program of the input television program recording reservation is one of the specific television programs, all the specific television programs of the television series or the television serial are retrieved from the television program schedule by the television program series retrieving means, a television program lump-sum recording reservation for all the specific television programs is produced by the television program recording reservation producing means, and the television program lump-sum recording reservation is registered in the television program recording reservation storing means in place of the input television program recording reservation.

Accordingly, even though the viewer overlooks the specific television programs other than the desired television program, because the television program lump-sum recording reservation for all the specific television programs is registered in place of the input television program recording reservation for the desired television program, all the specific television programs of the television series or the television serial can be reliably recorded, so that the viewer can entertain all the specific television programs played back.

Also, in cases where the viewer intends to record one specific television program different from the desired television program after the specific television programs are retrieved by the television program series retrieving means, a specific television program recording reservation for the specific television program is produced in place of the television program lump-sum recording reservation according to the television program schedule, and the specific television program recording reservation and the input television program recording reservation are registered in the television program recording reservation storing means.

Accordingly, the viewer can entertain the desired television program and the specific television program selected by the viewer.

The third object is achieved by the provision of a television program recording reservation apparatus, comprising:

television program schedule storing means for storing a television program schedule in which a broadcasting schedule of a plurality of television programs and program information of each television program are listed;

television program recording reservation receiving means for receiving a television program recording reservation for a television program;

television program recording reservation storing means for storing one or more television program recording reservations for one or more television programs received by the television program recording reservation receiving means as one or more registered television program recording reservations for registered television programs;

program information recording means for recording program information of one or more played-back television programs;

favorite television program retrieving means for determining a viewer's taste from the program information of the played-back television programs recorded in the program information recording means, and retrieving one or more favorite television programs, which each differ from any of the registered television programs and suit the viewer's taste, from the television program schedule; and television program recording reservation producing means for producing one or more favorite television program recording reservations for the favorite television programs retrieved by the favorite television program retrieving means from the television program schedule stored in the television program schedule storing means and storing the favorite television program recording reservations in the television program recording reservation storing means, the favorite television programs suitable for the viewer's taste being recorded according to the favorite television program recording reservations and being played back.

In the above configuration, a viewer watches various television programs respectively suiting a viewer's taste. Therefore, the viewer's taste can be determined by analyzing program information of one or more played-back television programs, and it is realized that the viewer desires to watch a television program suiting the viewer's taste even though a television program recording reservation for the television program is not recorded.

To satisfy the viewer, one or more favorite television programs, which respectively differ from any of the registered television programs and suit the viewer's taste, are retrieved from the television program schedule, one or more favorite television program recording reservations for the favorite television programs are produced, and the favorite television program recording reservations are registered in the television program recording reservation storing means.

Accordingly, even though the viewer overlooks the favorite television programs listed in the television program schedule, because the favorite television program recording reservations for the favorite television programs are automatically produced, the favorite television programs can be reliably recorded in a recording medium according to the favorite television program recording reservations and can be played back, so that the viewer can entertain the favorite television programs.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a television program recording reservation apparatus according to the present invention are described with reference to the drawings.

(First Embodiment)

Figure 1:
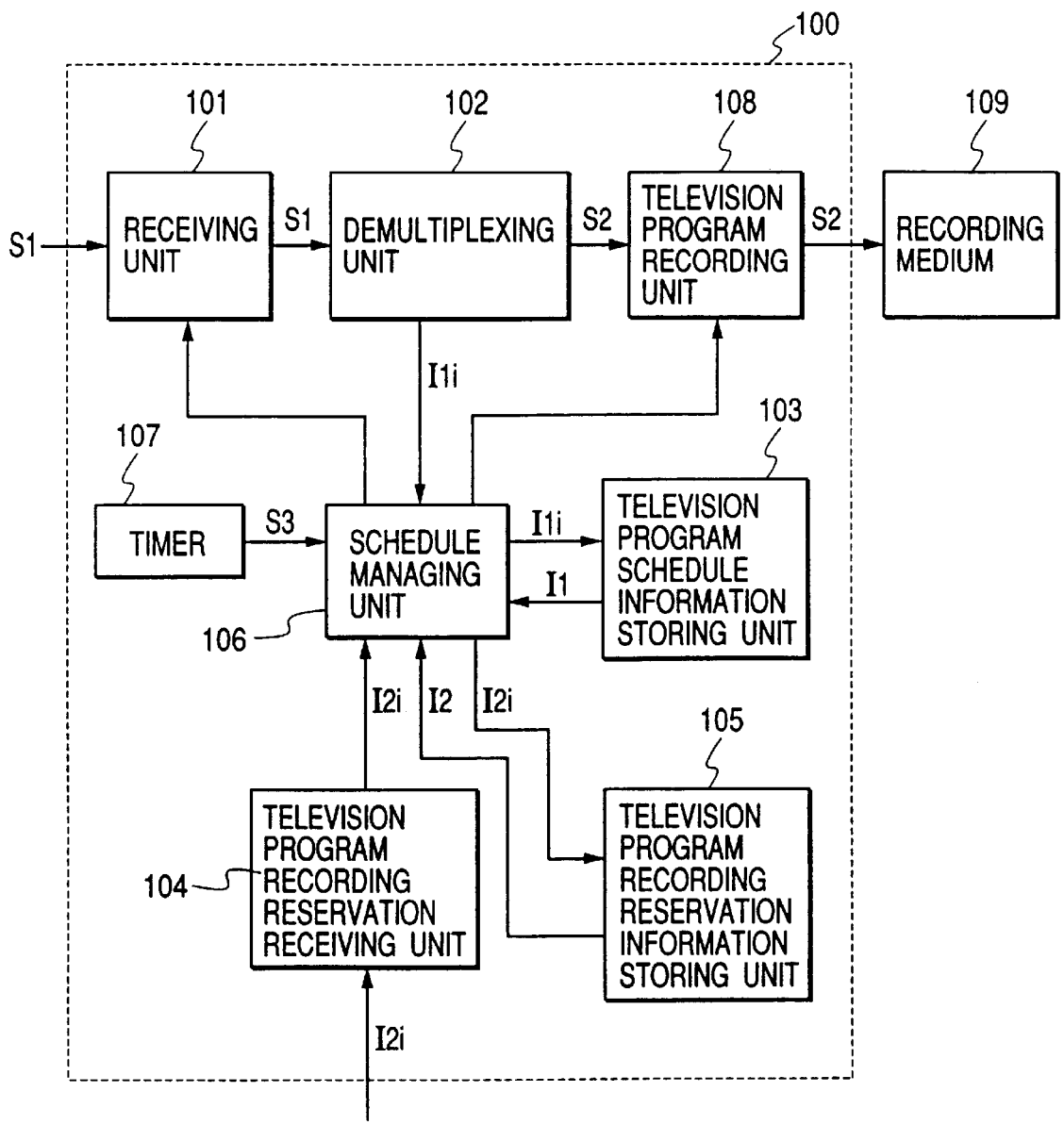
FIG. 1 is a block diagram of a conventional television program recording reservation apparatus.
Figure 2:
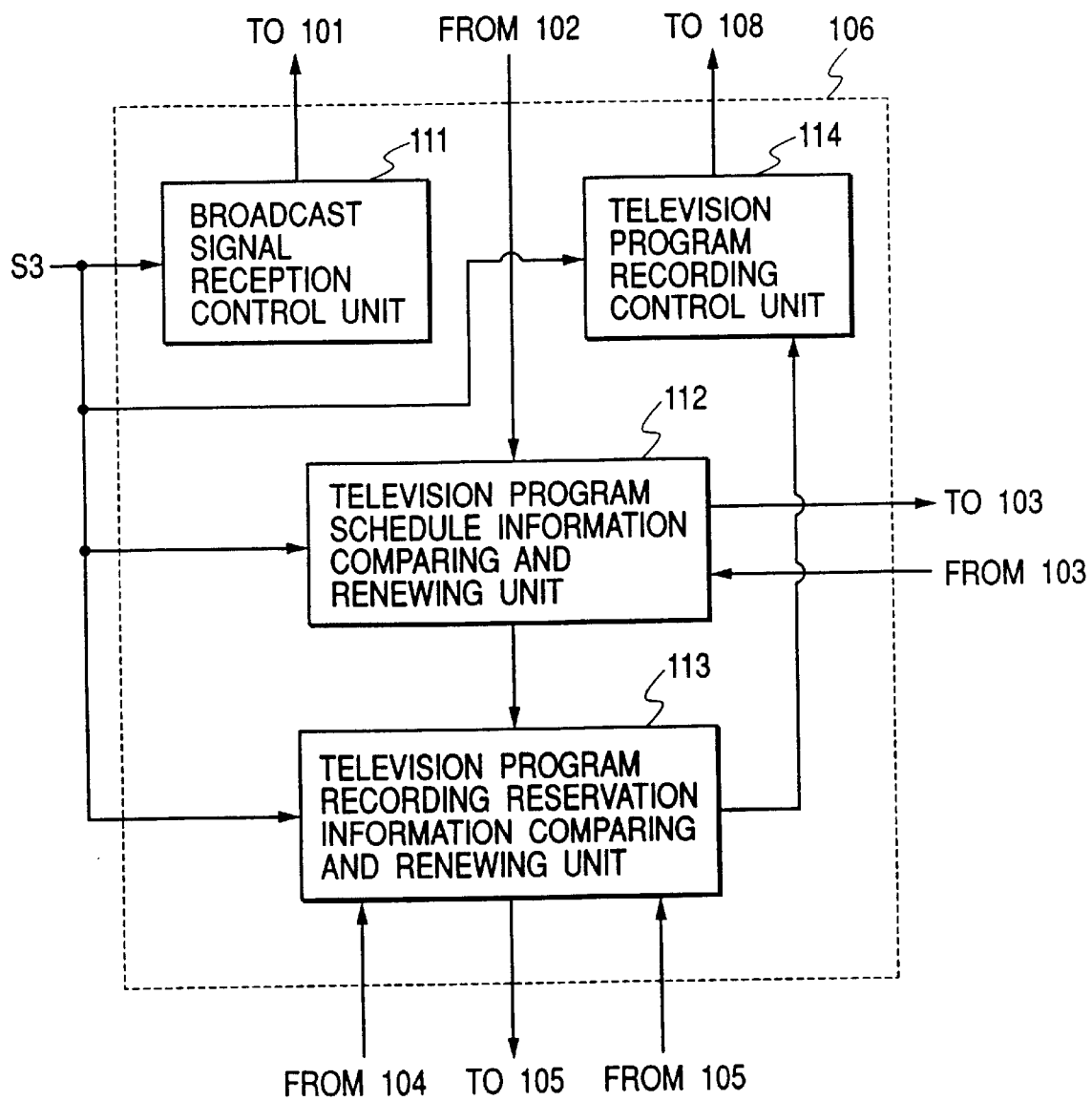
FIG. 2 is a block diagram of a schedule managing unit arranged in the conventional television program recording reservation apparatus shown in FIG. 1.
Figure 3A:
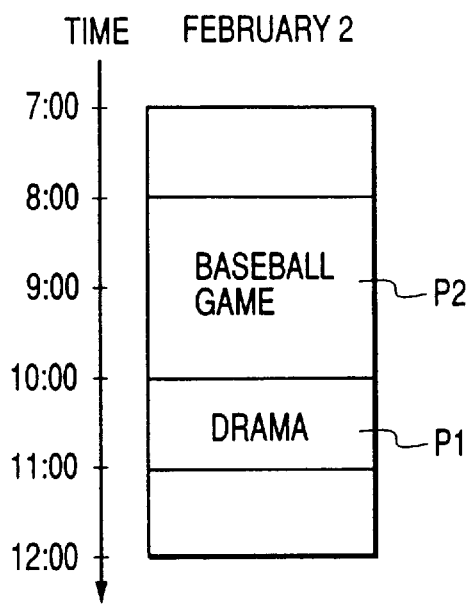
FIG. 3A shows an example of a television program schedule table in which the recording of a specific television program is reserved.
Figure 3B:
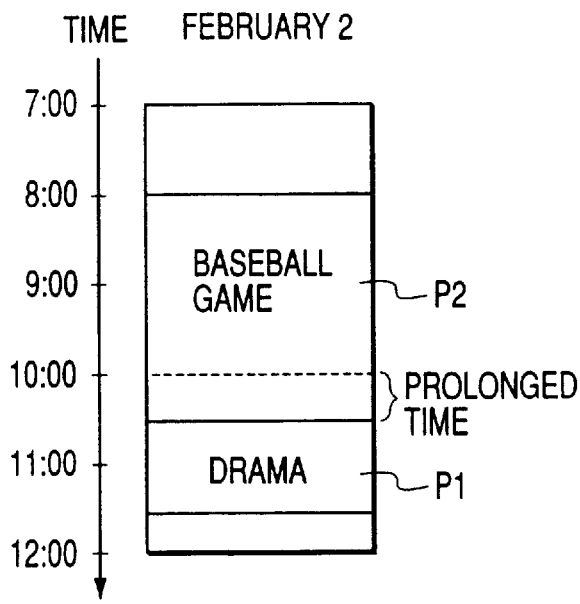
FIG. 3B shows an example of a renewed television program schedule table in which a recording time of the specific television program is changed.
Figure 4:
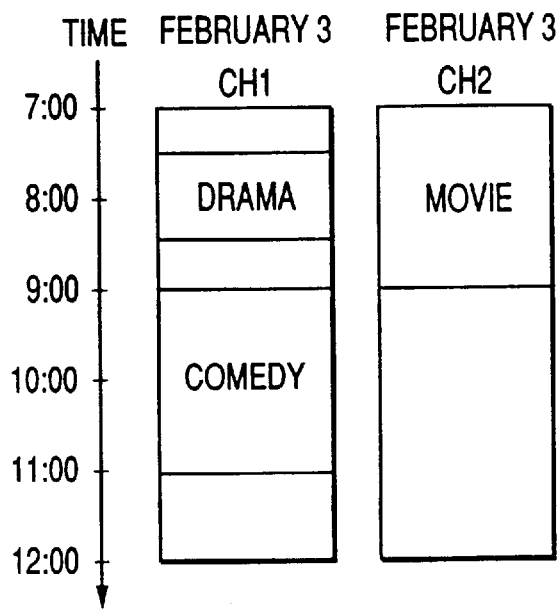
FIG. 4 shows an example of a television program schedule table in which the recording of a first television program planned to be broadcasted during a broadcasting time on a first channel has been already reserved and a viewer tries to reserve the recording of a second television program planned to be broadcasted on a second channel during a broadcasting time overlapping with that of the first television program.
Figure 5:
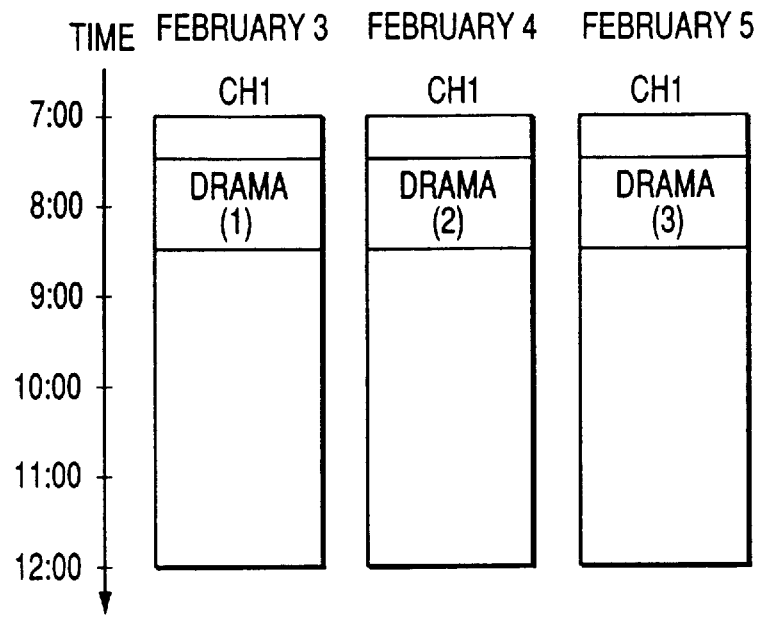
FIG. 5 shows an example of a television program schedule table in which a plurality of television programs planned to be broadcasted in the same prescribed broadcasting time are listed as a television series (or a television serial)
Figure 6:
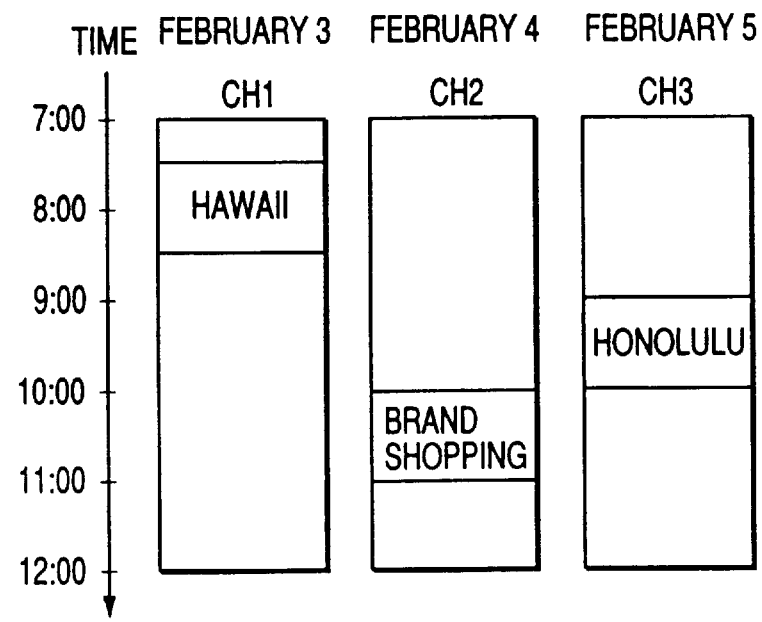
FIG. 6 shows an example of a television program schedule table in which a plurality of television programs suiting a taste of a viewer are listed.
Figure 7:
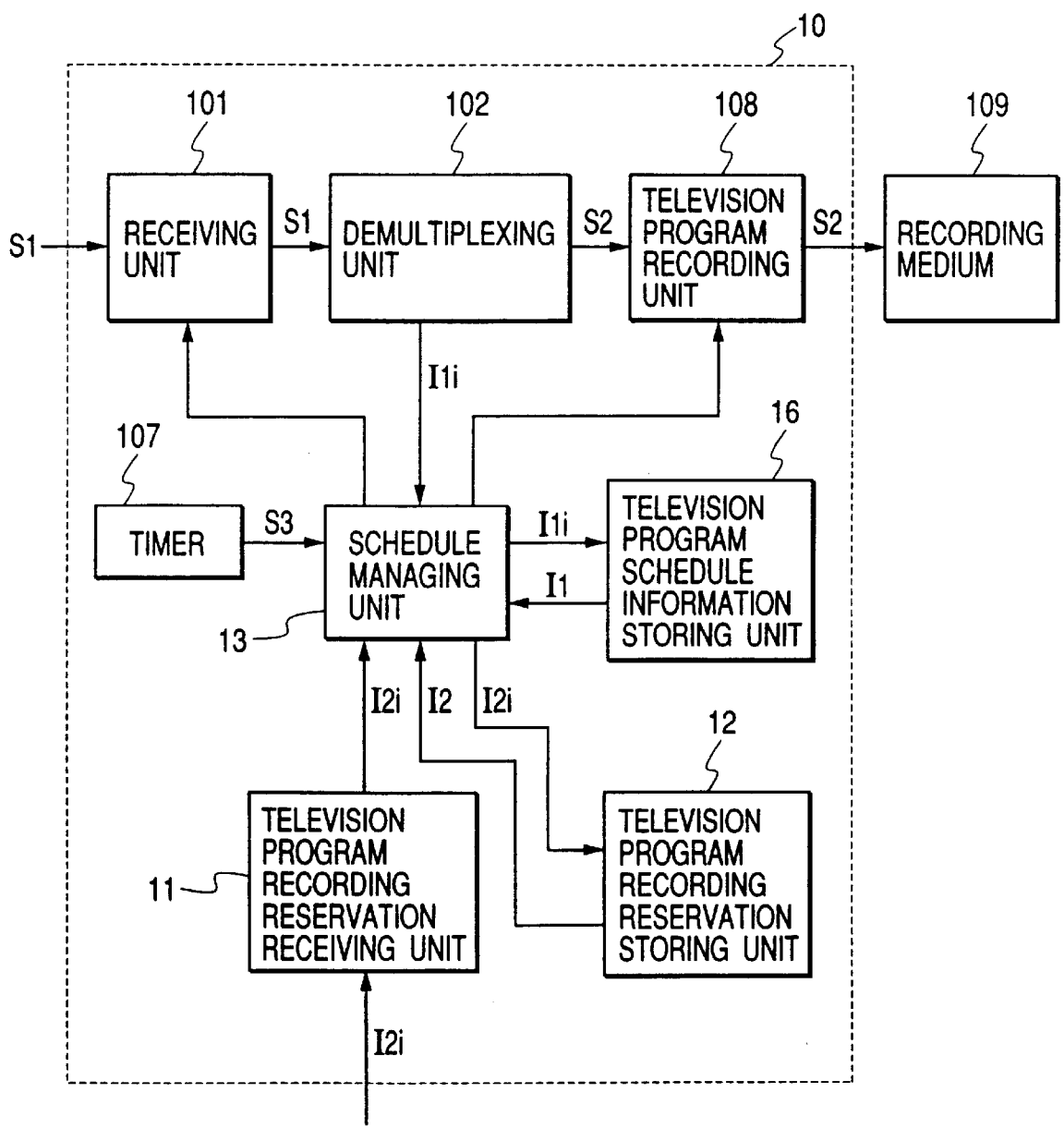
FIG. 7 is a block diagram of a television program recording reservation apparatus according to a first embodiment of the present invention.

FIG. 7 is a block diagram of a television program recording reservation apparatus according to a first embodiment of the present invention.

As shown in FIG. 7, a television program recording reservation apparatus 10 comprises the receiving unit 101; the demultiplexing unit 102;

a television program schedule information storing unit 16 for storing television program schedule information I1 of a plurality of television programs previously output from the demultiplexing unit 102, the rebroadcasting of each television program being indicated in the television program schedule information I1;

a television program recording reservation receiving unit 11 for receiving a television program recording reservation for a desired television program listed in the television program schedule information I1 from a viewer as an input television program recording reservation;

a television program recording reservation storing unit 12 for storing a plurality of television program recording reservations previously received in the receiving unit 11 as a plurality of registered television program recording reservations;

a schedule managing unit 13 for managing the television program schedule information storing unit 16 to renew the television program schedule information I1 stored in the storing unit 16 to the input television program schedule information I1i as updated television program schedule information I1 in cases where the input television program schedule information I1i differs from the television program schedule information I1, changing the input television program recording reservation (or a specific television program recording reservation for a specific television program) to a rebroadcast television program recording reservation for a rebroadcast television program (a rebroadcasted desired television program or a rebroadcasted specific television program), in cases where the input television program recording reservation overlaps with the specific television program recording reservation registered in the television program recording reservation storing unit 12, on condition that the rebroadcast television program recording reservation does not overlap with the specific television program recording reservation (or the input television program recording reservation) or any of the registered television program recording reservations other than the specific television program recording reservation (first operation), changing a schedule of the registered television program recording reservations registered in the television program recording reservation storing unit 12 to match with the television program schedule information I1 stored in the television program schedule information storing unit 16 each time the television program schedule information I1 is renewed to the updated television program schedule information I1, changing a first registered television program recording reservation registered in the storing unit 12 to a rebroadcast television program recording reservation, in cases where the first registered television program recording reservation overlaps with a second registered television program recording reservation registered in the storing unit 12 because of the change of the schedule of the registered television program recording reservations, on condition that a recording time (from a recording start time to a recording finish time) of the rebroadcast television program recording reservation does not overlap with a recording time of any of the registered television program recording reservations other than the first registered television program recording reservation (second operation), and controlling the television program recording unit 108 to record the television program in the recording medium 109 according to each television program recording reservation registered in the storing unit 12;

the timer 107; and the television program recording unit 108.

Figure 8:
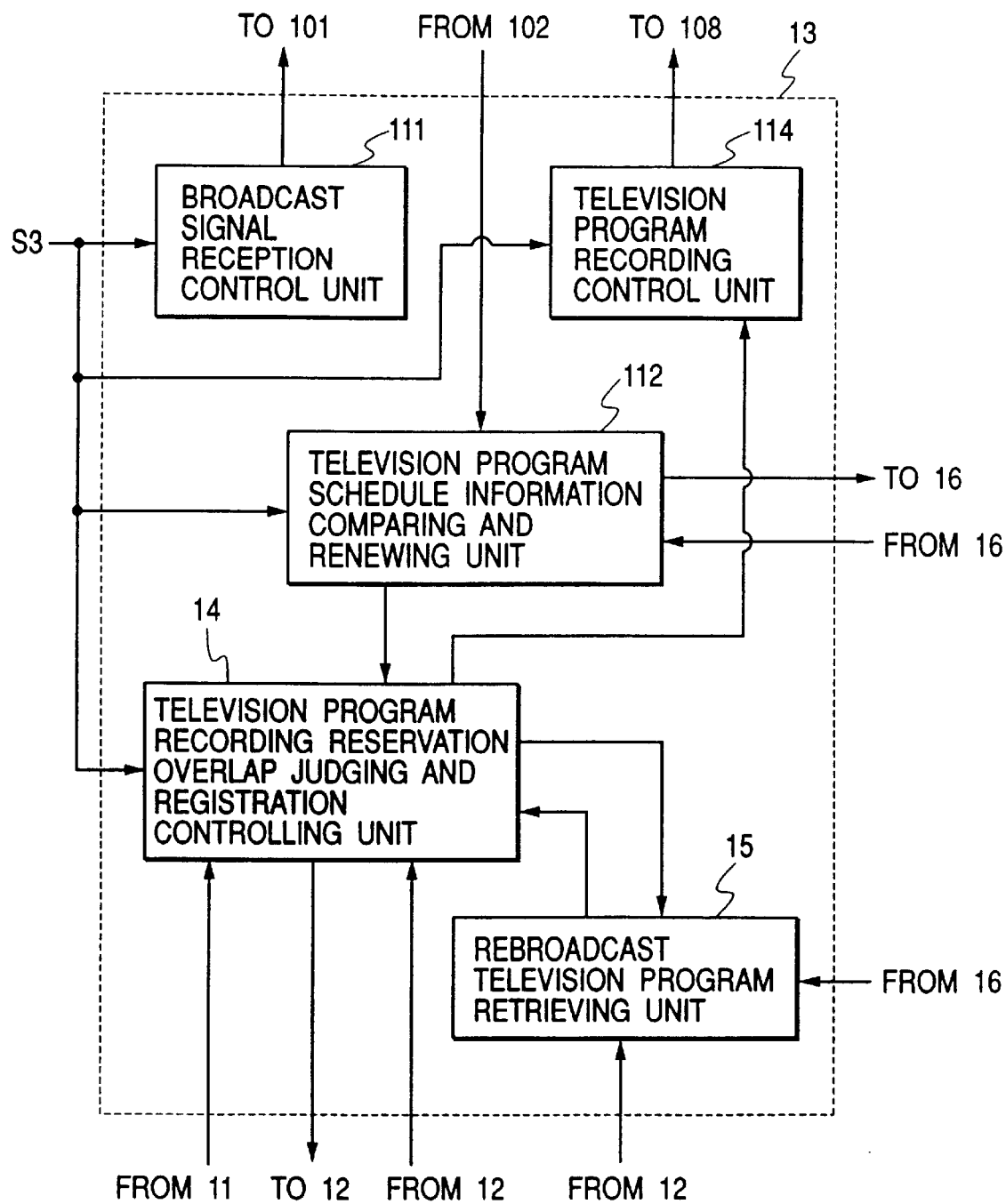
FIG. 8 is a block diagram of a schedule managing unit arranged in the television program recording reservation apparatus shown in FIG. 7.

FIG. 8 is a block diagram of a schedule managing unit arranged in the television program recording reservation apparatus.

As shown in FIG. 8, the schedule managing unit 13 comprises the broadcast signal reception control unit 111; the television program schedule information comparing and renewing unit 112;

a television program recording reservation overlap judging and registration controlling unit 14 for judging whether or not a recording time of the input television program recording reservation received in the receiving unit 11 overlaps with that of one of the registered television program recording reservations previously registered in the television program recording reservation storing unit 12, controlling the television program recording reservation storing unit 12 to store the input television program recording reservation as a registered television program recording reservation in cases where a recording time of the input television program recording reservation does not overlap with a recording time of any registered television program recording reservation registered in the storing unit 12, changing the input television program recording reservation for the desired television program (or the specific television program recording reservation for a specific television program) to a rebroadcast television program recording reservation for the same desired television program (or the same specific television program), in cases where a recording time of the input television program recording reservation overlaps with that of the specific television program recording reservation, and controlling the television program recording reservation storing unit 12 to store the rebroadcast television program recording reservation as a registered television program recording reservation (first operation), changing a schedule of the registered television program recording reservations registered in the television program recording reservation storing unit 12 according to the renewal of the television program schedule information I1 stored in the television program schedule information storing unit 16, and changing a first registered television program recording reservation for a first television program registered in the storing unit 12 to a rebroadcast television program recording reservation for the first television program in cases where the first registered television program recording reservation overlaps with a second registered television program recording reservation registered in the storing unit 12 (second operation);

a rebroadcast television program retrieving unit 15 for receiving the input television program recording reservation and the specific television program recording reservation from the television program recording reservation overlap judging and registration controlling unit 14 in cases where the recording time of the input television program recording reservation overlaps with that of the specific television program recording reservation, retrieving another desired television program (or another specific television program) rebroadcasted or repeatedly broadcasted from the television program schedule information I1 stored in the storing unit 16 as a rebroadcast television program on condition that a broadcasting time of the rebroadcast television program does not overlap with that of the specific television program (or the desired television program) or a recording time of any of the registered television program recording reservations other than the specific television program recording reservation (first operation), retrieving the first television program rebroadcasted or repeatedly broadcasted from the television program schedule information I1 stored in the storing unit 16 as a rebroadcast television program on condition that a broadcasting time of the rebroadcast television program does not overlap with a recording time of any of the registered television program recording reservations other than the first registered television program recording reservation (second operation), and transmitting the rebroadcast television program to the television program recording reservation overlap judging and registration controlling unit 14 to determine a television program recording reservation of the rebroadcast television program as the rebroadcast television program recording reservation in the overlap judging and registration controlling unit 14; and the television program recording control unit 114.

In the above configuration, an operation performed in the television program recording reservation apparatus 10 is described.

Input television program schedule information I1i is transmitted to the schedule managing unit 113 through the receiving unit 101 and the demultiplexing unit 102 under the control of the broadcast signal reception control unit 111, and the input television program schedule information I1i is stored in the television program schedule information storing unit 16 in place of the television program schedule information I1 as updated television program schedule information I1 in cases where the input television program schedule information I1i differs from the television program schedule information I1. In the television program schedule information I1, a broadcasting schedule (for example, a broadcasting date, a broadcasting time composed of a broadcasting start time and a broadcasting finish time and a broadcasting channel) of a plurality of television programs planned to be broadcasted is listed, and the television program schedule information I1 is displayed on a displaying unit (not shown), so that a viewer can reserve the recording of one or more television programs listed in the television program schedule information I1.

Thereafter, the recording of an input television program recording reservation (a first operation) or the renewing of a registered television program recording reservation (a second operation) is performed. Each television program recording reservation for a television program is composed of a broadcasting date, a broadcasting time (a broadcasting start time and a broadcasting finish time) and a broadcasting channel. A recording time of each television program recording reservation for a television program agrees with a broadcasting time of the television program.

Figure 9:
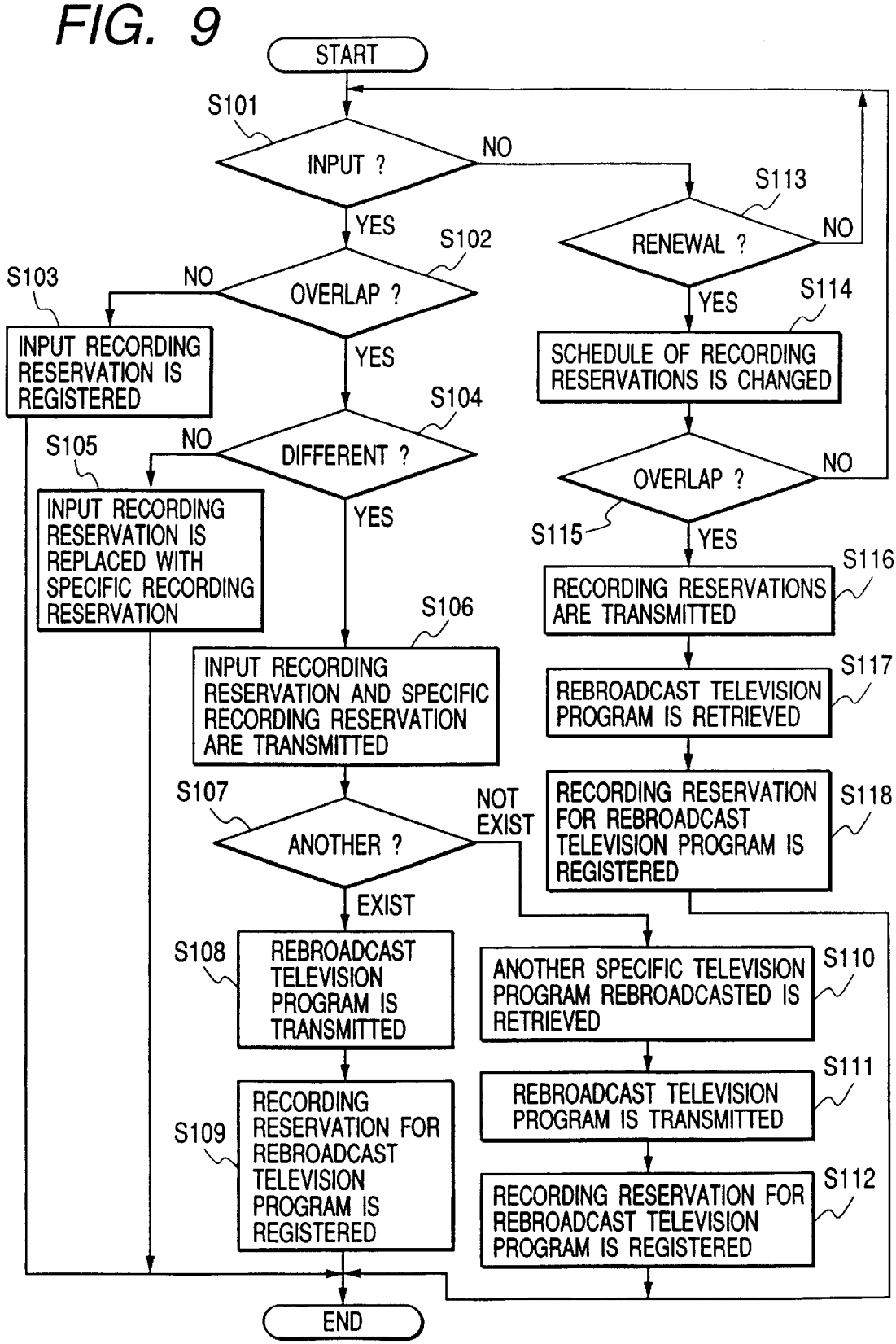
FIG. 9 is a flow chart showing a first operation and a second operation performed in the schedule managing unit shown in FIG. 8 according to the first embodiment.

FIG. 9 is a flow chart showing a first operation and a second operation performed in the schedule managing unit 13 according to the first embodiment.

As shown in FIG. 9, when a viewer inputs a television program recording reservation I2i for a desired television program listed in the television program schedule information I1 to the television program recording reservation receiving unit 11 (step S101), a recording time (a recording start time and a recording finish time) and a broadcasting channel of the desired television program listed in the television program schedule information I1 are attached to the television program recording reservation I2i under the control of the schedule managing unit 13, and a first operation is performed. In detail, it is judged in the television program recording reservation overlap judging and registration controlling unit 14 whether or not the recording time of the input television program recording reservation I2i overlaps with a recording time of one television program recording reservation I2 previously registered in the television program recording reservation storing unit 12 (step S102). A recording time of a television program recording reservation for a television program is the same as a broadcasting time of the television program corresponding to the television program recording reservation. In cases where the recording time of the input television program recording reservation I2i does not overlap with any of the reservation times of the registered television program recording reservations I2, the input television program recording reservation I2i is additionally registered in the storing unit 12 (step S103). In contrast, in cases where the recording time of the input television program recording reservation I2i overlaps with a recording time of a specific television program recording reservation I2s for a specific television program, it is judged whether or not contents of the desired television program differs from those of the specific television program (step S104). In cases where the desired television program has the same contents as the specific television program, the input television program recording reservation I2i is registered in the storing unit 12 in place of the specific television program recording reservation I2s (step S105). In contrast, in cases where the contents of the desired television program differs from those of the specific television program (step S104), the input television program recording reservation I2i and the specific television program recording reservation I2s overlapping with each other are transmitted to the rebroadcast television program retrieving unit 15 (step S106).

In the retrieving unit 15, it is checked whether or not another desired television program rebroadcasted or repeatedly broadcasted exists in the television program schedule information I1 of the storing unit 16 on condition that a broadcasting time of the desired television program rebroadcasted or repeatedly broadcasted does not overlap with a recording time of any of the registered television program recording reservations of the storing unit 12 (step S107). In cases where another desired television program rebroadcasted or repeatedly broadcasted exists, the desired television program rebroadcasted or repeatedly broadcasted is retrieved as a rebroadcast television program from the television program schedule information I1, the rebroadcast television program is transmitted to the television program recording reservation overlap judging and registration controlling unit 14 (step S108), and a television program recording reservation for the rebroadcast television program is automatically registered in the storing unit 12 under the control of the overlap judging and registration controlling unit 14 without recording the input television program recording reservation I2i (step S109). Contents of the rebroadcast television program are the same as contents of the desired television program corresponding to the input television program recording reservation I2i.

In cases where any desired television program rebroadcasted or repeatedly broadcasted is not found (step S107), another specific television program rebroadcasted or repeatedly broadcasted is retrieved as a rebroadcast television program from the television programs listed in the television program schedule information I1 of the storing unit 16 on condition that a broadcasting time of the rebroadcast television program does not overlap with a recording time of the input television program recording reservation I2i or a recording time of any of the registered television program recording reservations other than the specific television program recording reservation I2s (step S110). Contents of the rebroadcast television program are the same as contents of the specific television program corresponding to the specific television program recording reservation I2s. Thereafter, the rebroadcast television program is transmitted to the television program recording reservation overlap judging and registration controlling unit 14 (step S111), and a television program recording reservation for the rebroadcast television program is automatically registered in the storing unit 12 in place of the specific television program recording reservation I2s under the control of the overlap judging and registration controlling unit 14 (step S112).

Figure 10A:
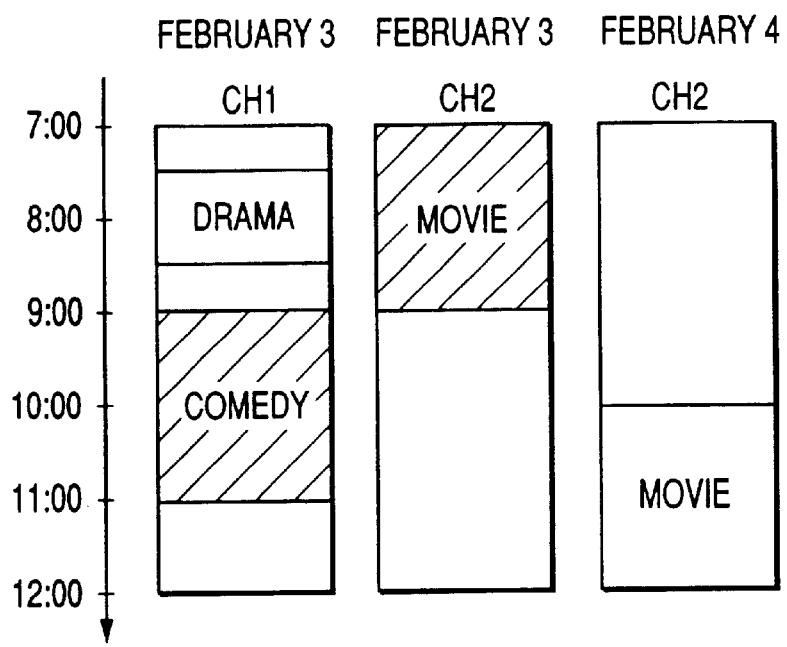
FIG. 10A shows a television program schedule table in which a broadcasting time of a desired television program "drama" corresponding to an input television program recording reservation overlaps with a specific television program "movie" corresponding to a specific television program recording reservation.
Figure 10B:
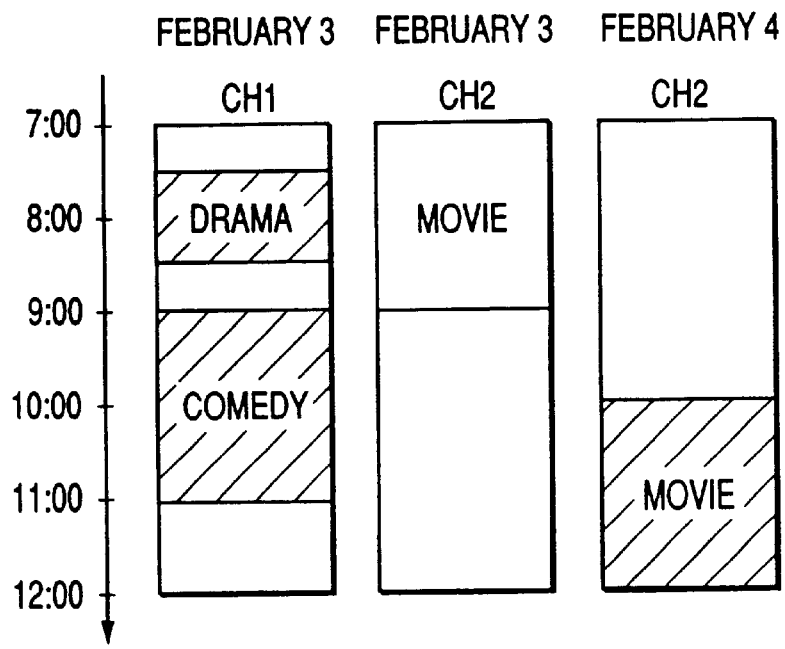
FIG. 10B shows the television program schedule table in which the specific television program recording reservation overlapping with the input television program recording reservation is automatically changed to another television program recording reservation of the rebroadcast television program "movie" having the same contents as those of the specific television program according to a first television program recording reservation operation of the first embodiment.

An example of the first operation is shown in FIG. 10A and FIG. 10B.

A specific television program recording reservation for a specific television program "movie" has been already registered. When an input television program recording reservation for a desired television program "drama" is input, as shown in FIG. 10A, a recording time (from 7:30 to 8:30 of February 3) of the input television program recording reservation overlaps with a recording time (from 7:00 to 9:00 of February 3) of the specific television program recording reservation. Therefore, the television program schedule information I1 is automatically searched for another desired television program "drama" rebroadcasted or repeatedly broadcasted. Because a desired television program "drama" not overlapping with any of television programs corresponding to the television program recording reservations already registered is not found, the television program schedule information I1 is again searched for another specific television program "movie" rebroadcasted or repeatedly broadcasted. As shown in FIG. 10B, because another specific television program "movie" of a broadcasting time (from 9:00 to 11:00 of February 4) not overlapping with the desired television program "drama" or any of television programs corresponding to the registered television program recording reservations other than the specific television program recording reservation is found, a television program recording reservation for the specific television program "movie" of the broadcasting time (from 9:00 to 11:00 of February 4) is automatically registered in the storing unit 12 in place of the specific television program recording reservation.

Accordingly, even though the television program recording reservation I2i overlapping with one of the registered television program recording reservations I2 is input by the viewer, the desired television program corresponding to the input television program recording reservation I2i can be reliably registered without failing in the recording of television programs corresponding to the registered television program recording reservation I2.

Returning to FIG. 9, in cases where any input television program recording reservation I2i is not detected in the receiving unit 11 (step S101), when information indicating the renewal of the television program schedule information I1 stored in the storing unit 16 is transmitted from the comparing and renewing unit 112 to the overlap judging and registration controlling unit 14 (step S113), a second operation is performed. In detail, a schedule of the registered television program recording reservations registered in the television program recording reservation storing unit 12 is changed to match with the renewed television program schedule information I1 (step S114), and it is judged in the overlap judging and registration controlling unit 14 whether or not the overlapping of registered television program recording reservations with each other occurs in the storing unit 12 because of the renewal of the television program schedule information I1 (step S115). In cases where a first registered television program recording reservation for a first television program overlaps with a second registered television program recording reservation for a second television program because a recording time of the first or second registered television program recording reservation is changed to match with the renewed television program schedule information I1, the first and second registered television program recording reservations overlapping with each other are transmitted to the rebroadcast television program retrieving unit 15 (step S116).

In the retrieving unit 15, another first television program rebroadcasted or repeatedly broadcasted is retrieved as a rebroadcast television program from television programs listed in the renewed television program schedule information I1 of the storing unit 16 on condition that a broadcasting time of the rebroadcast television program does not overlap with a recording time of any of the registered television program recording reservations other than the first registered television program recording reservation (step S117). Contents of the rebroadcast television program are the same as contents of the first television program corresponding to the first television program recording reservation. Thereafter, the rebroadcast television program is transmitted to the television program recording reservation overlap judging and registration controlling unit 14, and a television program recording reservation for the rebroadcast television program is automatically registered to the storing unit 12 in place of the first television program recording reservation under the control of the overlap judging and registration controlling unit 14 (step S118).

Figure 11A:
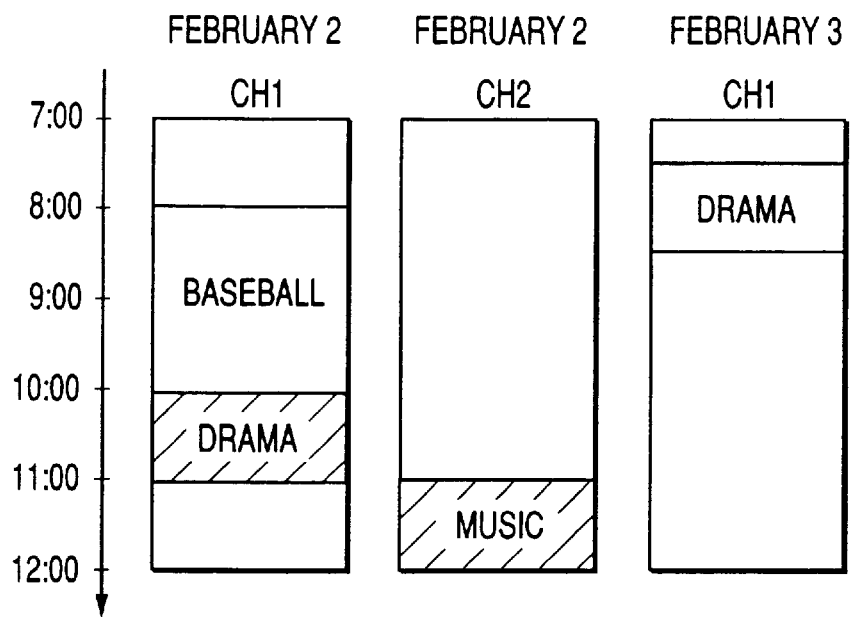
FIG. 11A shows a television program schedule table in which the recording of a first television program and a second television program not overlapping with each other is reserved.
Figure 11B:
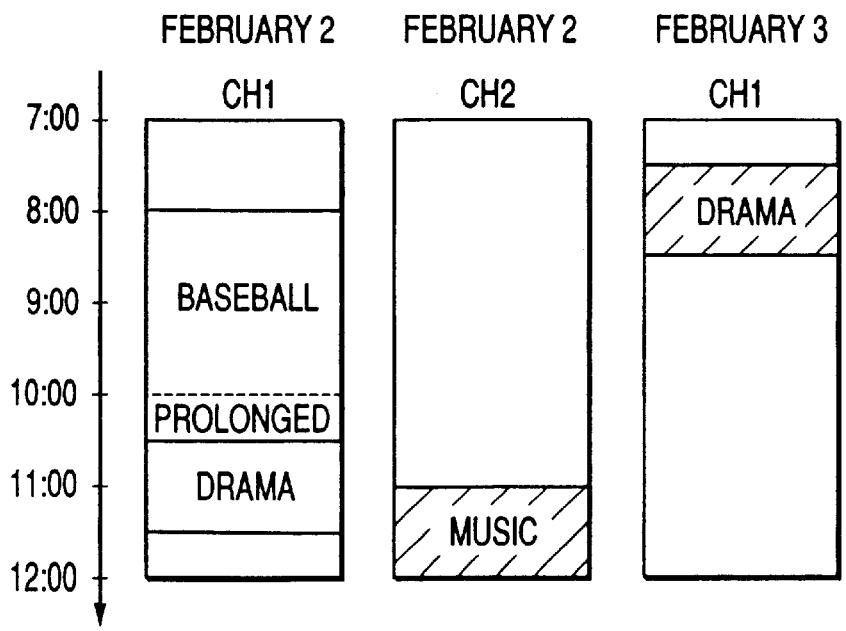
FIG. 11B shows a renewed television program schedule table in which a television program recording reservation of the first television program is changed to another television program recording reservation of the first television program rebroadcasted according to a second television program recording reservation operation of the first embodiment because a broadcasting duration of a television program broadcasted just before the first television program is prolonged to make a broadcasting time of the first television program overlap with a broadcasting time of the second television program.

An example of the second operation is shown in FIG. 11A and FIG. 11B.

As shown in FIG. 11A, a first television program recording reservation for a first television program "drama" of a broadcasting time (from 10:00 to 11:00 of February 2) and a second television program recording reservation for a second television program "music" of a broadcasting time (from 11:00 to 12:00 of February 2) have been already registered. the first and second television program recording reservations do not overlap with each other. In cases where a television program "baseball" broadcasted just before the first television program is prolonged by 30 minutes, the television program schedule information I1 stored in the storing unit 16 is renewed. Therefore, a broadcasting time of the first television program is delayed by 30 minutes, and the broadcasting time of the first television program overlaps with a broadcasting time of the second television program. In this case, as shown in FIG. 11B, because a broadcasting time (from 7:30 to 8:30 of February 3) of a rebroadcast television program "drama" having the same contents as those of the first television program do not overlap with that of the second television program, the first television program recording reservation overlapping with the second television program recording reservation is automatically changed to another television program recording reservation for the rebroadcast television program "drama".

Accordingly, even though the television program schedule information I1 of the storing unit 16 is renewed to make a first registered television program recording reservation overlap with a second registered television program recording reservation, because the first registered television program recording reservation for the first registered television program is automatically replaced with a television program recording reservation for the rebroadcast television program having the same contents as those of the first registered television program, all television programs corresponding to the registered television program recording reservations can be reliably registered.

In this embodiment, in the step S105, the input television program recording reservation I2$i$ is registered to the storing unit 12 in place of the specific television program recording reservation I2$s$ in cases where the desired television program has the same contents as the specific television program. However, it is applicable that the input television program recording reservation I2$i$ be automatically canceled in cases where the desired television program has the same contents as the specific television program.

Also, in the step S107, the television program schedule information I1 is searched for another desired television program rebroadcasted or repeatedly broadcasted before the television program schedule information I1 is searched for another specific television program rebroadcasted or repeatedly broadcasted. However, it is applicable that the television program schedule information I1 be searched for another desired television program rebroadcasted or repeatedly broadcasted after the television program schedule information I1 is searched for another specific television program rebroadcasted or repeatedly broadcasted.

Also, it is applicable that an importance degree of each television program recording reservation be input with the television program recording reservation to the television program recording reservation receiving unit 11 and each television program recording reservation with the importance degree is registered in the television program recording reservation storing unit 12. In this case, when a recording time of the input television program recording reservation overlaps with that of the specific television program recording reservation in the step S102, the television program schedule information I1 is searched for a rebroadcast television program having the same contents as those of the television program corresponding to the television program recording reservation of the lower importance degree in the step S107. Also, when two television program recording reservations overlap with each other in the step S115, the television program recording reservation of the lower importance degree is selected, and the television program schedule information I1 is searched for a rebroadcast television program having the same contents as those of the television program corresponding to the selected television program recording reservation.

Also, in the step S107, in cases where a plurality of rebroadcast television programs having the same contents as the desired television program or the specific television program are retrieved, it is applicable that one rebroadcast television program broadcasted earliest among the rebroadcast television programs be selected.

Also, in the steps S107 to S112, the television program recording reservation for the rebroadcast television program is registered. However, it is applicable that a recording time of the input television program recording reservation I2$i$ overlapping with the specific television program recording reservation I2$s$ be shortened not to overlap with the specific television program recording reservation I2$s$. Also, it is applicable that a recording time of the specific television program recording reservation I2$s$ overlapping with the input television program recording reservation I2*i* be shortened not to overlap with the input television program recording reservation I2*i*. Also, it is applicable that the input television program recording reservation I2*i* overlapping with the specific television program recording reservation I2*s* be canceled. Also, it is applicable that the specific television program recording reservation I2*s* overlapping with the input television program recording reservation I2*i* be canceled.

(Second Embodiment)

In this embodiment, a television program lump-sum recording reservation for a plurality of specific television programs broadcasted as a television series (or a television serial) is automatically registered when a viewer inputs a television program recording reservation for one specific television program.

Figure 12:
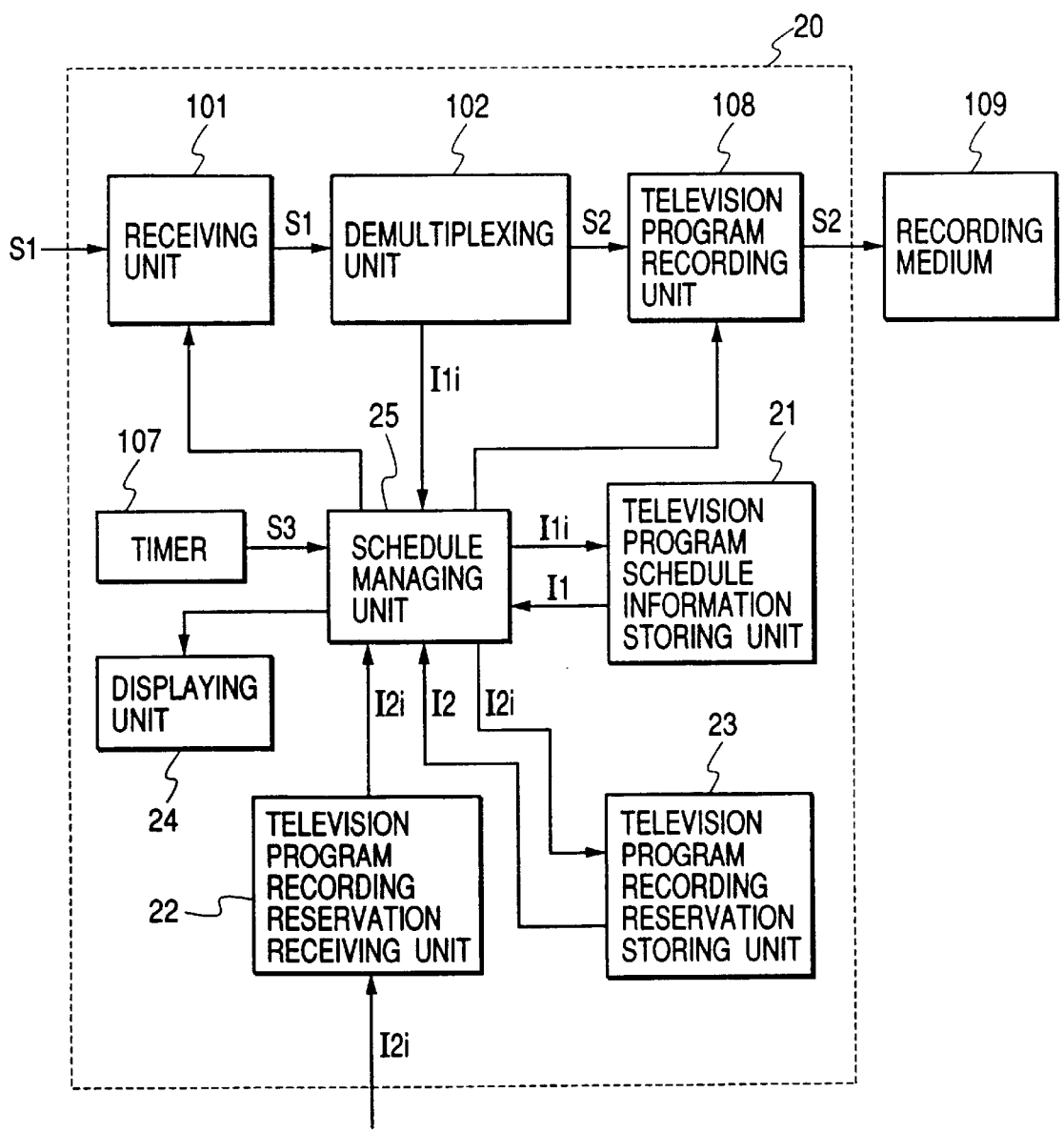
FIG. 12 is a block diagram of a television program recording reservation apparatus according to a second embodiment of the present invention.

FIG. 12 is a block diagram of a television program recording reservation apparatus according to a second embodiment of the present invention.

As shown in FIG. 12, a television program recording reservation apparatus 20 comprises the receiving unit 101; the demultiplexing unit 102;

a television program schedule information storing unit 21 for storing television program schedule information I1 of a plurality of television programs previously output from the demultiplexing unit 102;

a television program recording reservation receiving unit 22 for receiving a television program recording reservation for a desired television program listed in the television program schedule information I1 from a viewer as an input television program recording reservation;

a television program recording reservation storing unit 23 for storing one or more television program recording reservations received in the receiving unit 22 as one or more registered television program recording reservations and recording one or more television program lump-sum recording reservations as one or more registered television program lump-sum recording reservations;

a displaying unit 24 for displaying guide information of television programs;

a schedule managing unit 25 for managing the television program schedule information storing unit 21 to renew the television program schedule information I1 stored in the storing unit 21 to the input television program schedule information I1*i* as updated television program schedule information I1 in cases where the input television program schedule information I1*i* differs from the television program schedule information I1, judging according to the television program schedule information I1 stored in the storing unit 21 whether or not the desired television program corresponding to the input television program recording reservation is one of a plurality of specific television programs planned to be broadcasted as a television series (or a television serial), controlling the television program recording reservation storing unit 23 to store a television program lump-sum recording reservation or one or more television program recording reservations including the input television program recording reservation in cases where the desired television program corresponding to the input television program recording reservation is one of the specific television programs planned to be broadcasted as a television series (or a television serial), controlling the television program recording reservation storing unit 23 to store the input television program recording reservation in cases where the desired television program corresponding to the input television program recording reservation is not any specific television program, and controlling the television program recording unit 108 to record a television program in the recording medium 109 according to each television program recording reservation registered in the storing unit 23; the timer 107; and the television program recording unit 108.

Figure 13:
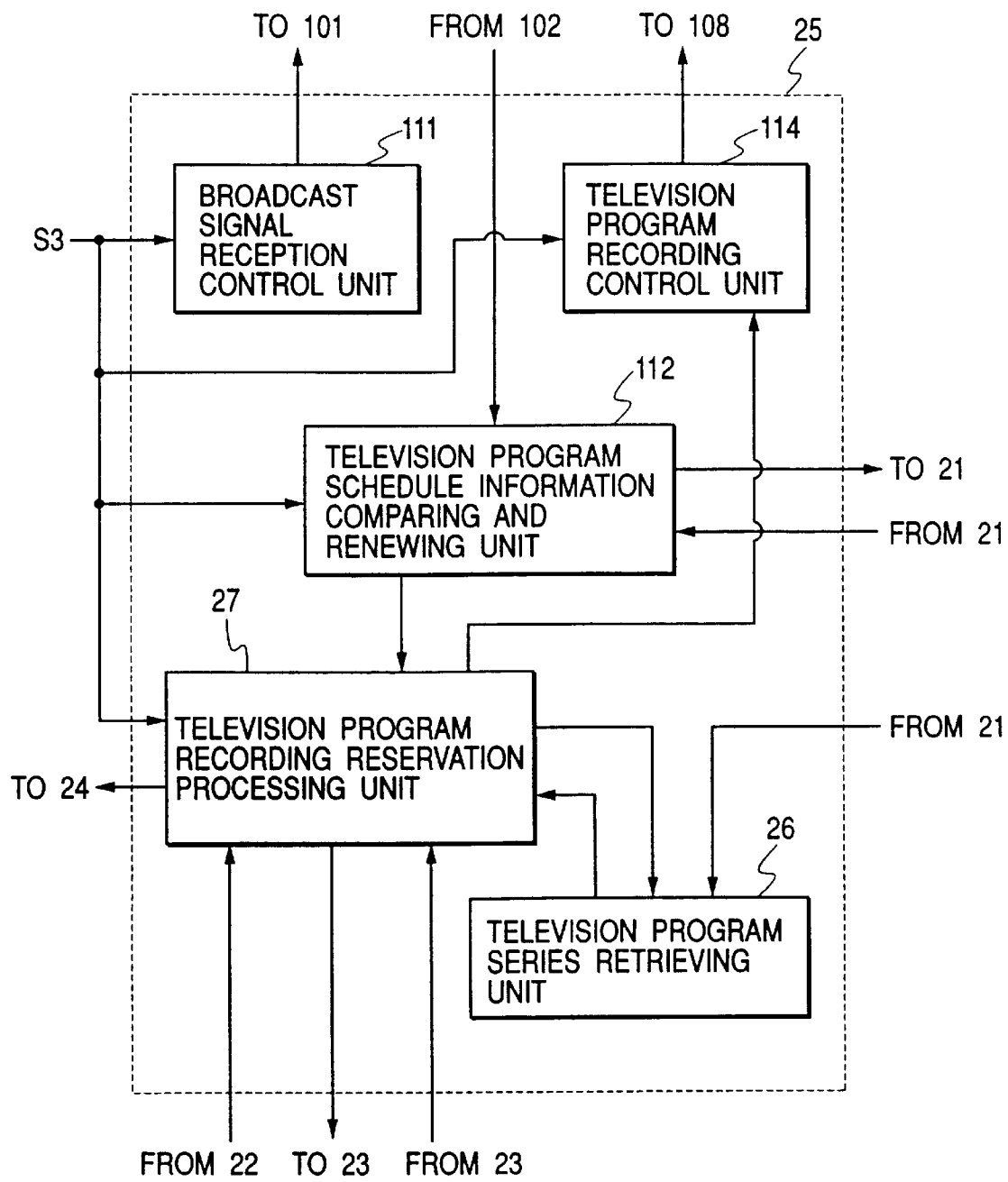
FIG. 13 is a block diagram of a schedule managing unit arranged in the television program recording reservation apparatus shown in FIG. 12.

FIG. 13 is a block diagram of the schedule managing unit 25 arranged in the television program recording reservation apparatus 20.

As shown in FIG. 13, the schedule managing unit 25 comprises the broadcast signal reception control unit 111; the television program schedule information comparing and renewing unit 112;

a television program series retrieving unit 26 for receiving an identification code of the desired television program corresponding to the input television program recording reservation, judging according to the television program schedule information I1 stored in the storing unit 21 whether or not the desired television program identified by the identification code is one of the specific television programs planned to be broadcasted as a television series (or a television serial), retrieving first information (a broadcasting time, a broadcasting channel and a broadcasting date) of each specific television program from the television program schedule information I1 in cases where the desired television program is one of the specific television programs, and producing second information, indicating that the desired television program is not any specific television program, in cases where the desired television program is not any specific television program;

a television program recording reservation processing unit 27 for receiving the input television program recording reservation from the receiving unit 22, transmitting the identification code of the desired television program corresponding to the input television program recording reservation to the television program series retrieving unit 26, receiving the first information or the second information from the retrieving unit 26, controlling the displaying unit 24 to display guide information of the specific television programs broadcasted as a television series (or a television serial) and information indicating that the desired television program specified by a viewer is one of the specific television programs according to the first information in cases where the desired television program corresponding to the input television program recording reservation is one of the specific television programs, producing a television program lump-sum recording reservation for all the specific television programs according to the television program schedule information I1 stored in the storing unit 21 in cases where a viewer selects the lump-sum recording reservation for all the specific television programs, producing a specific television program recording reservation for one specific television program according to the television program schedule information I1 in cases where the viewer selects the specific television program, controlling the television program recording reservation storing unit 23 to store the television program lump-sum recording reservation or a set of the specific television program recording reservation and the input television program recording reservation in cases where the desired television program corresponding to the input television program recording reservation is one of the specific television programs, and controlling the television program recording reservation storing unit 23 according to the second information to store the input television program recording reservation in cases where the desired television program corresponding to the input television program recording reservation is not any specific television program; and the television program recording control unit 114.

In the above configuration, an operation performed in the television program recording reservation apparatus 20 is described.

The input television program schedule information I1*i* is stored in the television program schedule information storing unit 21 as updated television program schedule information I1 in the same manner as in the first embodiment, and the television program schedule information I1 is displayed on the displaying unit 24, so that a viewer can reserve the recording of one or more television programs listed in the television program schedule information I1.

Thereafter, a recording reservation processing operation is performed in the television program series retrieving unit 26 and the television program recording reservation processing unit 27.

Figure 14:
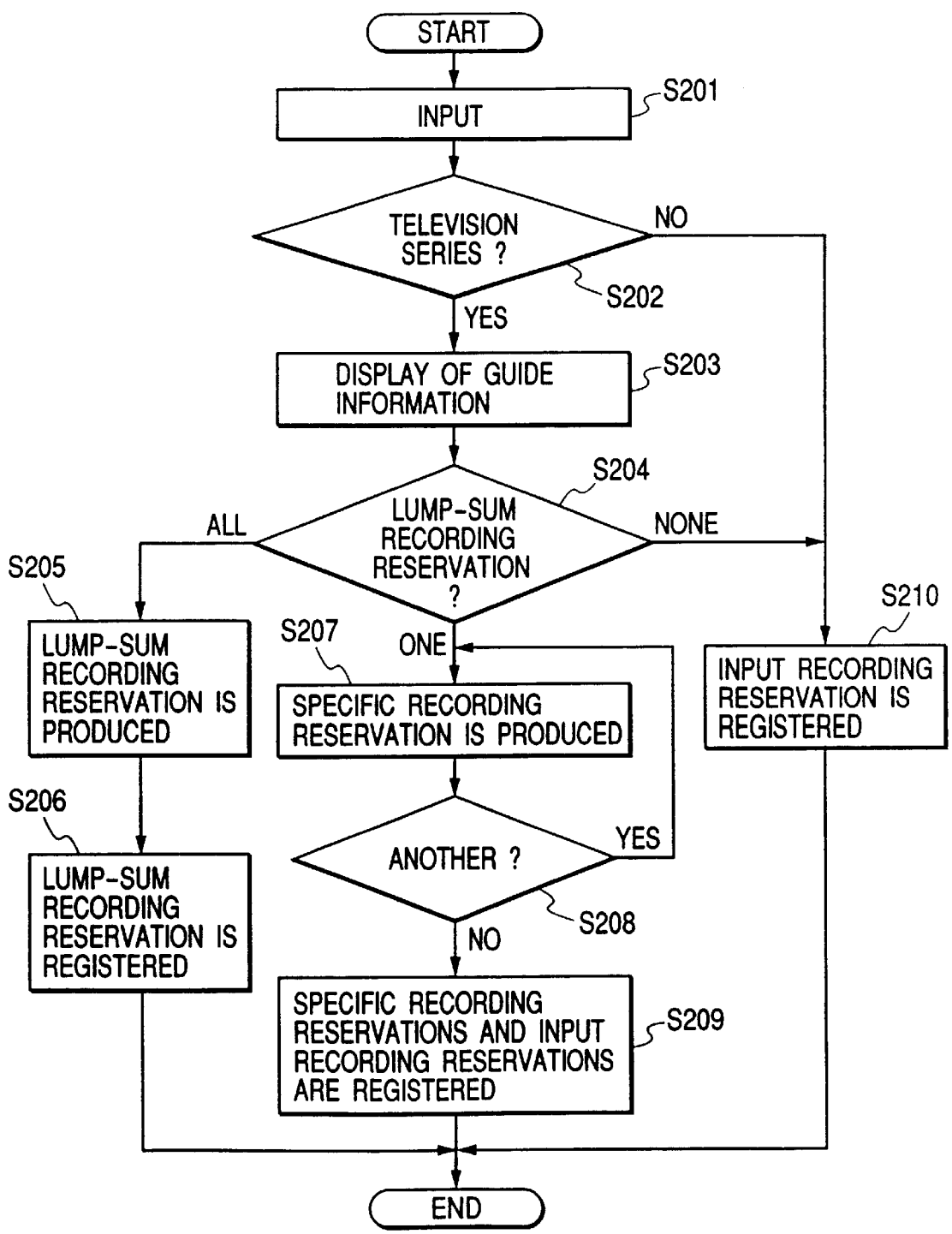
FIG. 14 is a flow chart showing a recording reservation processing operation according to the second embodiment.

FIG. 14 is a flow chart showing a recording reservation processing operation according to the second embodiment.

As shown in FIG. 14, when a viewer inputs a television program recording reservation I2*i* for a desired television program listed in the television program schedule information I1 to the television program recording reservation receiving unit 22 (step S201), the input television program recording reservation I2*i* is transmitted to the television program recording reservation processing unit 27. In the processing unit 27, a broadcasting time and a broadcasting channel of the desired television program listed in the television program schedule information I1 are attached to the input television program recording reservation I2*i*, and an identification code of the desired television program corresponding to the input television program recording reservation I2*i* is transmitted to the television program series retrieving unit 26. In the retrieving unit 26, the television program schedule information I1 stored in the storing unit 21 is searched for the desired television program identified by the identification code, and it is judged whether or not the desired television program is one specific television program in a series of specific television programs or a television serial (step S202).

In cases where the desired television program is one specific television program in a series of specific television programs or a television serial, guide information of the specific television programs is retrieved from the television program schedule information I1 and is transmitted to the processing unit 27, and the guide information of the specific television programs are displayed on the displaying unit 24 under the control of the processing unit 27 (step S203). Therefore, the viewer can recognize that the desired television program is one specific television program in a series of specific television programs or a television serial, so that the viewer can select all the specific television programs, one specific television program or none of them.

When a viewer selects a lump-sum recording reservation for all the specific television programs (step S204), a television program lump-sum recording reservation for all the specific television programs is produced in the processing unit 27 according to the television program schedule information I1 (step S205), and the television program lump-sum recording reservation for all the specific television programs is automatically registered in the storing unit 23 in place of the input television program recording reservation I2*i* (step S206).

Also, when the viewer selects one specific television program (step S204), a specific television program recording reservation for the specific television program selected by the viewer is produced according to the television program schedule information I1 (step S207). The production of the specific television program recording reservation is performed each time the viewer selects one specific television program (step S208). Thereafter, one or more specific television program recording reservations and the input television program recording reservation I2*i* are automatically registered in the storing unit 23 (step S209).

Also, when the viewer selects no specific television program (step S204), any specific television program recording reservation is not produced, and the input television program recording reservation I2*i* is automatically registered in the storing unit 23 (step S210).

In cases where the desired television program is not any specific television program (step S202), information, indicating that the desired television program is not any specific television program, is transmitted from the retrieving unit 26 to the processing unit 27, and the input television program recording reservation I2*i* is automatically registered in the storing unit 23 according to the information (step S210).

Figure 15:
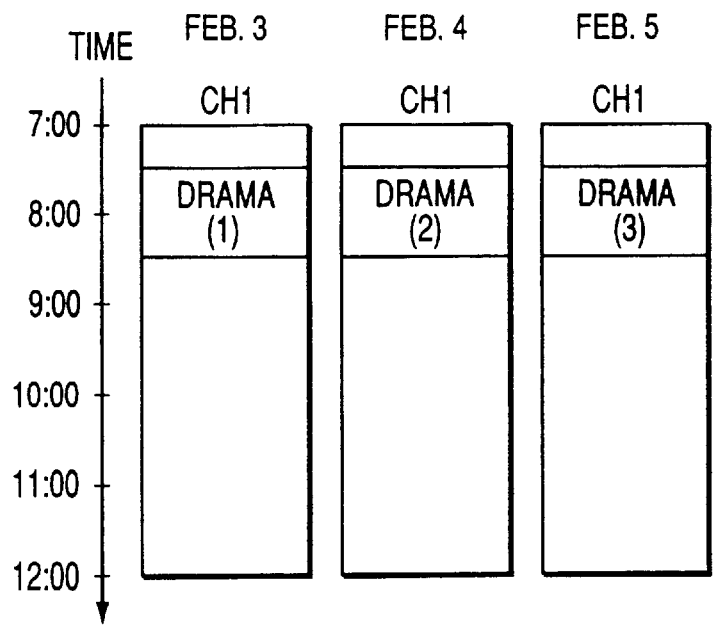
FIG. 15 shows a television program schedule table in which a first-time specific drama broadcasted on February 3, a second-time specific drama broadcasted on February 4 and a third-time specific drama broadcasted on February 5 corresponding to a television program lump-sum recording reservation automatically registered are listed.

An example of the recording reservation processing operation is shown in FIG. 15.

As shown in FIG. 15, in cases where a viewer inputs a television program recording reservation for a first-time specific television program "drama (1)" broadcasted on February 3, guide information of a specific drama series composed of the first-time specific drama, a second-time specific television program "drama (2)" broadcasted on February 4 and a third-time specific television program "drama (3)" broadcasted on February 5 is displayed, and a television program lump-sum recording reservation for the first-time specific television program, the second-time specific television program and the third-time specific television program is registered.

Accordingly, even though the viewer inputs a television program recording reservation for one television program in a series of television programs or a television serial, a television program lump-sum recording reservation for all television programs in the series of television programs (or the television serial) or television program recording reservations for one or more television programs in the series of television programs (or the television serial) can be registered to record all the television programs or one or more television programs selected by the viewer.

In this embodiment, guide information of all specific television programs broadcasted in series or in serial is displayed. However, in cases where a viewer inputs a title common to the specific television programs broadcasted in series or in serial, because it is apparent that the viewer desires to watch all the specific television programs broadcasted in series or in serial, it is preferred that a television program lump-sum recording reservation for all the specific television programs be automatically registered without any display of the guide information.

(Third Embodiment)

In this embodiment, a television program recording reservation for a television program suiting a viewer's taste is automatically registered.

Figure 16:
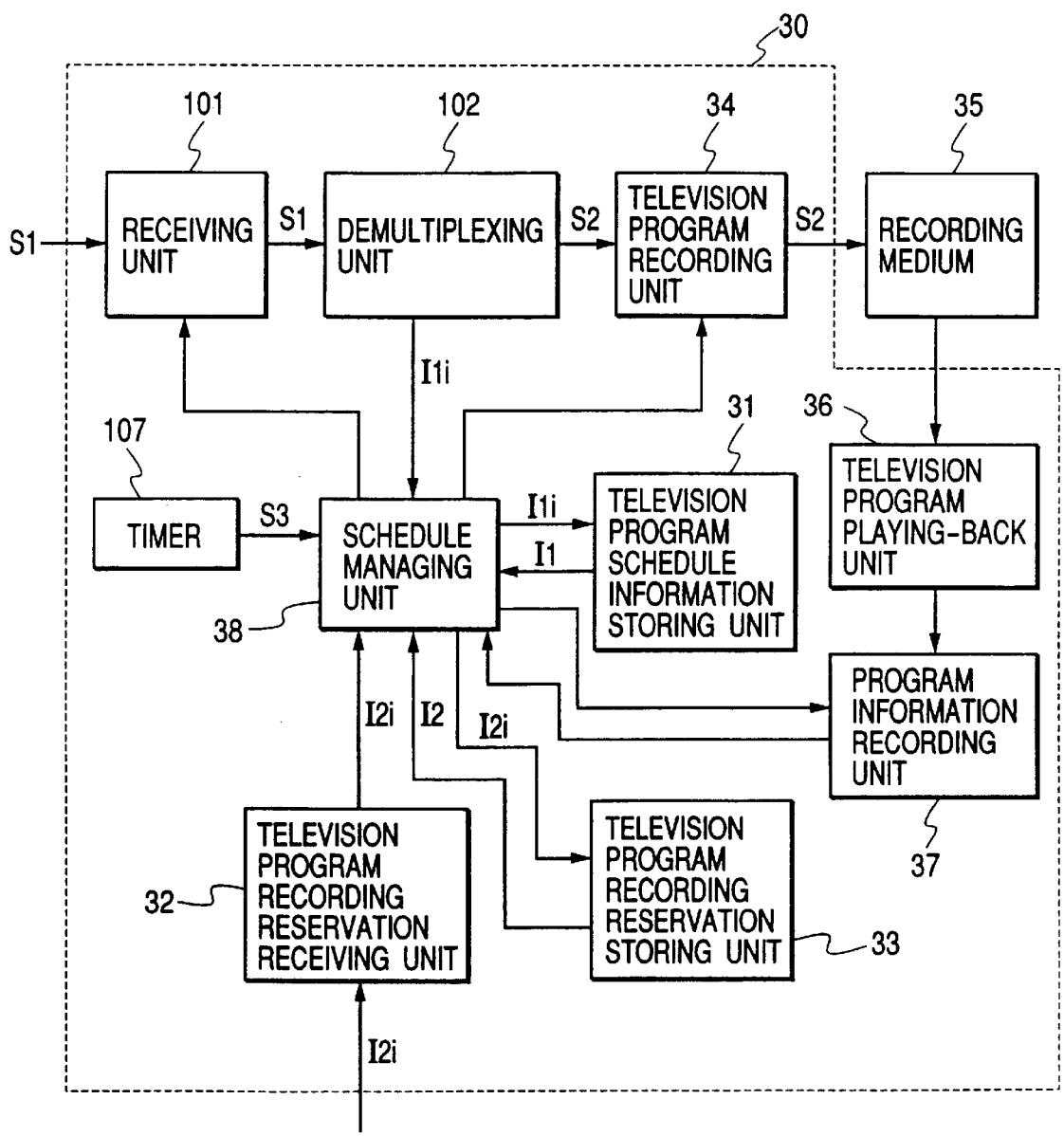
FIG. 16 is a block diagram of a television program recording reservation apparatus according to a third embodiment of the present invention.

FIG. 16 is a block diagram of a television program recording reservation apparatus according to a third embodiment of the present invention.

As shown in FIG. 16, a television program recording reservation apparatus 30 comprises
the receiving unit 101; the demultiplexing unit 102;

a television program schedule information storing unit 31 for storing television program schedule information I1 of a plurality of television programs previously output from the demultiplexing unit 102, program information (such as a title, a genre, summary information and the like) of one television program being attached to the television program schedule information I1 for each television program;

a television program recording reservation receiving unit 32 for receiving a television program recording reservation for a desired television program listed in the television program schedule information I1 from a viewer;

a television program recording reservation storing unit 33 for storing a plurality of television program recording reservations respectively received in the receiving unit 32 as one or more registered television program recording reservations for registered television programs;

a television program recording unit 34 for recording the television program signal S2 output from the demultiplexing unit 102 in a recording medium 35 during a broadcasting time of one television program which is indicated by each registered television program recording reservation registered in the television program recording reservation storing unit 33, the television program signal S2 of each television program indicating contents of the television program and program information (such as a title, a genre, summary information and the like) of the television program;

a television program playing-back unit 36 for playing back the television program signal S2 of each television program recorded in the recording medium 35 according to a viewer's intention;

a program information recording unit 37 for recording the program information of each television program played back in the television program playing-back unit 36 and recording the program information of the television program corresponding to each television program recording reservation registered in the television program recording reservation storing unit 33, the program information of the television programs indicating a viewer's taste;

a schedule managing unit 38 for managing the television program schedule information storing unit 31 to renew the television program schedule information I1 stored in the storing unit 31 to the input television program schedule information I1i as updated television program schedule information I1 in cases where the input television program schedule information I1i differs from the television program schedule information I1, determining a viewer's taste from the program information recorded in the program information recording unit 37, retrieving one or more favorite television programs suiting the viewer's taste from television programs listed in the television program schedule information I1 of the storing unit 31 on condition that each favorite television program is not the same as any of the registered television programs of the registered television program recording reservations registered in the television program recording reservation storing unit 33, producing one or more favorite television program recording reservations for the favorite television programs according to the television program schedule information I1, controlling the television program recording reservation storing unit 33 to store the favorite television program recording reservations, and controlling the television program recording unit 34 to record a television program in the recording medium 35 according to each television program recording reservation registered in the storing unit 33; and the timer 107.

Figure 17:
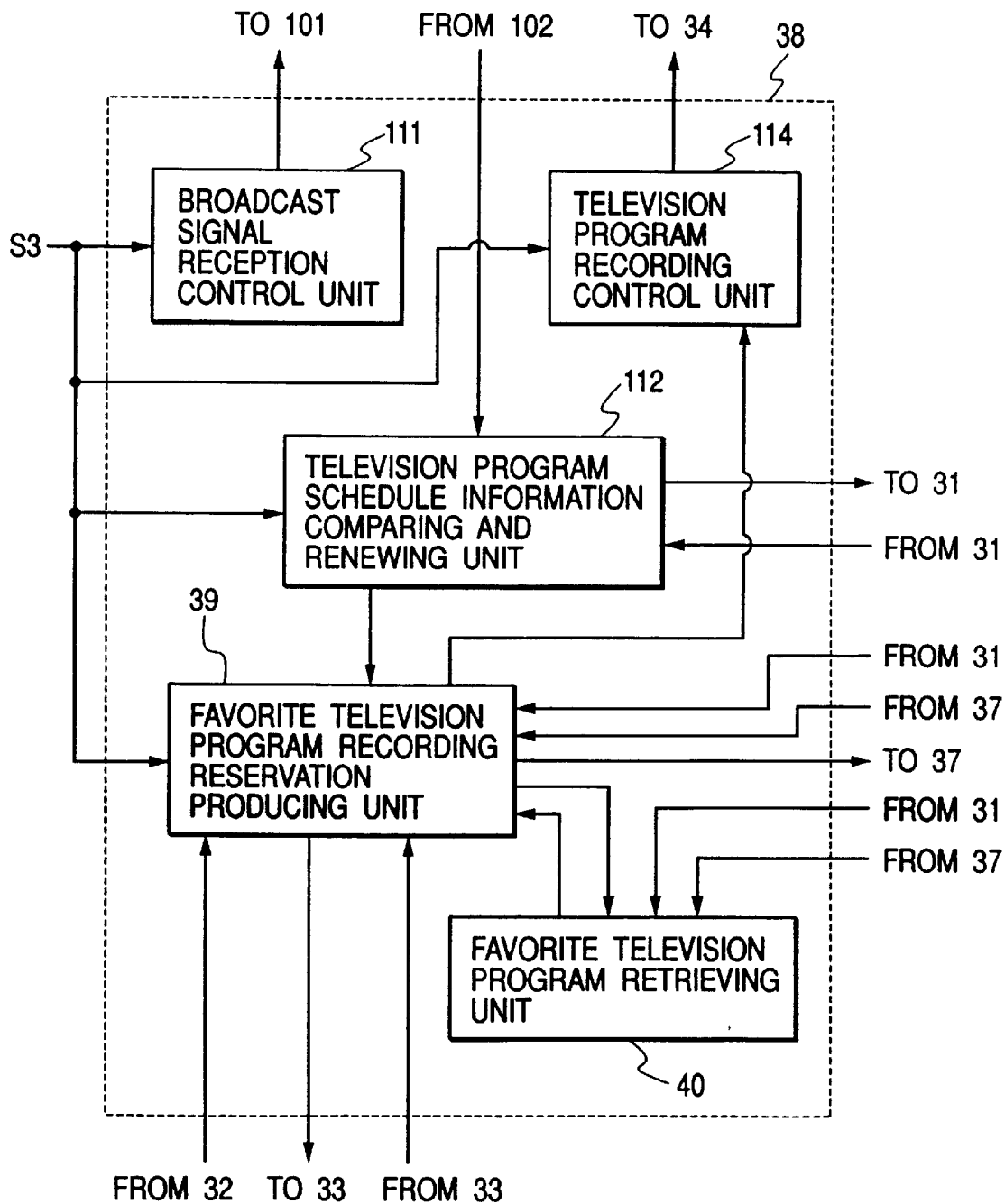
FIG. 17 is a block diagram of a schedule managing unit arranged in the television program recording reservation apparatus shown in FIG. 16.

FIG. 17 is a block diagram of the schedule managing unit 38 arranged in the television program recording reservation apparatus 300.

As shown in FIG. 17, the schedule managing unit 38 comprises
the broadcast signal reception control unit 111; the
television program schedule information comparing and renewing unit 112;

a favorite television program retrieving unit 39 for determining a viewer's taste such as a viewer's favorite title word or a viewer's favorite genre according to an occurrence frequency of each of keywords used in the program information of the program information recording unit 37 and used in the program information of the registered television programs corresponding to the registered television program recording reservations of the storing unit 33, extracting a program feature (such as a title word or a genre) of each television program listed in the television program schedule information I1 of the storing unit 31 according to an occurrence frequency of each of keywords used in the program information of the television program, calculating a similarity degree between the viewer's taste and the program feature of each television program listed in the television program schedule information I1, and retrieving one or more television programs of high similarity degrees from the television programs listed in the television program schedule information I1 as one or more favorite television programs suiting the viewer's taste on condition that each favorite television program is not the same as any of the registered television programs of the registered television program recording reservations registered in the television program recording reservation storing unit 33;

a favorite television program recording reservation producing unit 40 for controlling the television program recording reservation storing unit 33 to store the input television program recording reservation received from the receiving unit 22, retrieving the program information of the television program corresponding to each television program recording reservation of the storing unit 33 from the television program schedule information I1 of the television program schedule information storing unit 31, controlling the program information recording unit 37 to record the retrieved program information of the television programs corresponding to the television program recording reservations, receiving the favorite television programs suiting the viewer's taste from the favorite television program retrieving unit 39, producing one or more favorite television program recording reservations for the favorite television programs according to the television program schedule information I1, and controlling the television program recording reservation storing unit 33 to store the favorite television program recording reservations; and the television program recording control unit 114.

In the above configuration, an operation performed in the television program recording reservation apparatus 30 is described.

The input television program schedule information I1$i$ is stored in the television program schedule information storing unit 31 as updated television program schedule information I1 in the same manner as in the first embodiment, and the television program schedule information I1 is displayed on a displaying unit (not shown). Therefore, a viewer can reserve the recording of one or more television programs listed in the television program schedule information I1.

Also, each time a viewer inputs a television program recording reservation for a desired television program listed in the television program schedule information I1 to the television program recording reservation receiving unit 32, a broadcasting time and a broadcasting channel of the desired television program listed in the television program schedule information I1 are attached to the input television program recording reservation, and the input television program recording reservation is registered in the storing unit 33 as a registered television program recording reservation I2 under the control of the favorite television program recording reservation producing unit 40.

Thereafter, when a television program signal S2 of a television program corresponding to one registered television program recording reservation registered in the television program recording reservation storing unit 33 is output from the demultiplexing unit 102, the television program signal S2 is recorded in the recording medium 35 by the recording unit 34 according to the registered television program recording reservation under the control of the television program recording control unit 114. The television program signal S2 of a television program indicates contents of the television program and program information (such as a title, a genre, summary information and the like) of the television program. The recording of the television program signal S2 is performed for each registered television program recording reservation registered in the storing unit 33.

Thereafter, each television program signal S2 recorded in the recording medium 35 is played back in the television program playing-back unit 36, and the program information of the television program included in each television program signal S2 is recorded in the program information recording unit 37. In this case, one or more registered television program recording reservations remain in the television program recording reservation storing unit 33.

Thereafter, a recording reservation producing operation is performed in the favorite television program retrieving unit 39 and the favorite television program recording reservation producing unit 40.

Figure 18:
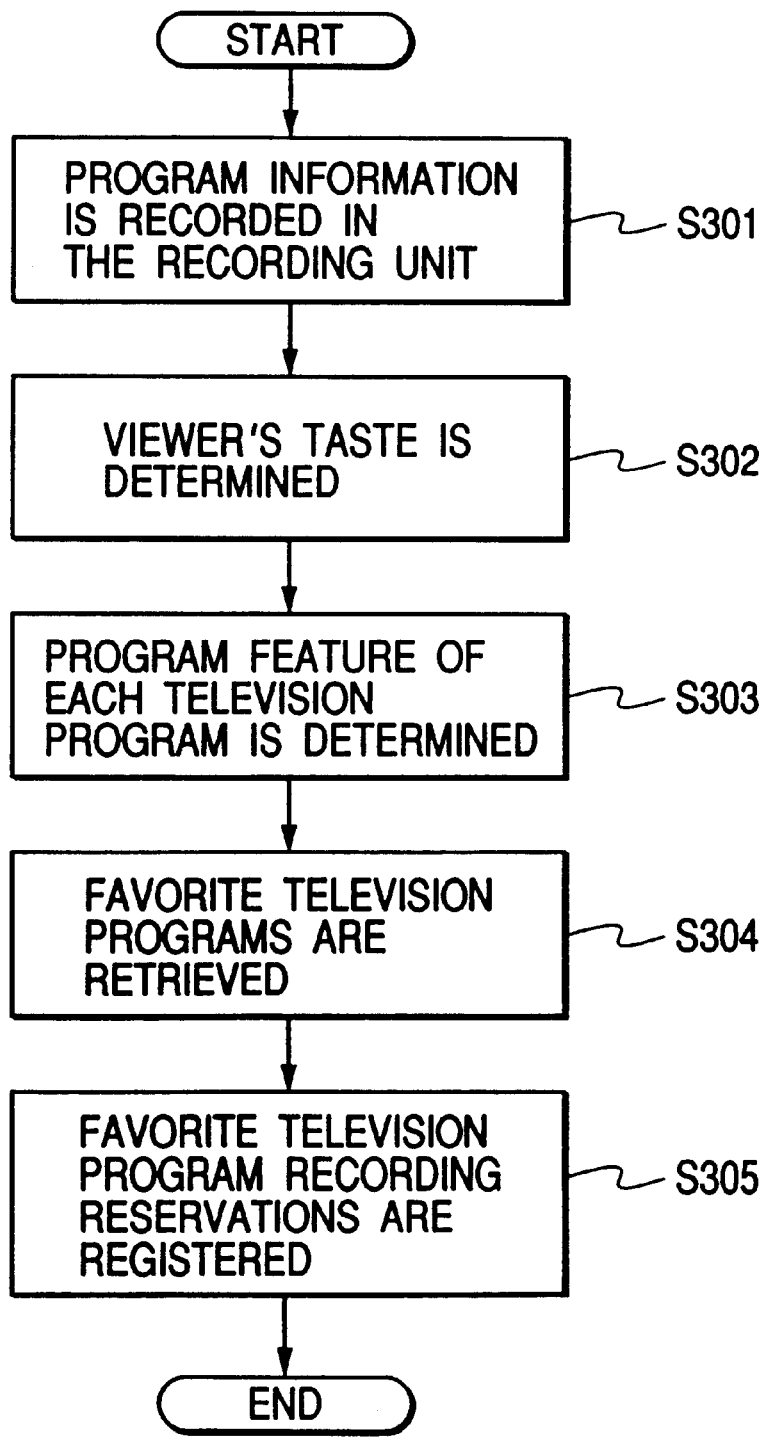
FIG. 18 is a flow chart showing a recording reservation producing operation according to the third embodiment.

FIG. 18 is a flow chart showing a recording reservation producing operation according to the third embodiment.

As shown in FIG. 18, the program information of the registered television program corresponding to each registered television program recording reservation remaining in the storing unit 33 is retrieved from the television program schedule information I1 of the storing unit 31 under the control of the favorite television program recording reservation producing unit 40, and the program information of the registered television programs is recorded in the program information recording unit 37 in addition to the program information of the played-back television programs (step S301).

Thereafter, in the retrieving unit 39, an occurrence frequency of each of keywords used in the program information of the program information recording unit 37 is counted, and a viewer's taste such as viewer's favorite title words or a viewer's favorite genre is determined according to the occurrence frequency of each keyword (step S302). Also, a program feature (such as a title word or a genre) of each television program listed in the television program schedule information I1 of the storing unit 31 is determined according to an occurrence frequency of each of keywords used in the program information of the television program on condition that the television program differs from any of the registered television programs of the registered television program recording reservations (step S303). Thereafter, a similarity degree between the viewer's taste and the program feature of each television program listed in the television program schedule information I1 is estimated, and one or more television programs of high similarity degrees are retrieved from the television programs listed in the television program schedule information I1 as one or more favorite television programs suiting the viewer's taste (step S304). Each favorite television program differs from any of the registered television programs of the registered television program recording reservations. The favorite television programs suiting the viewer's taste are transmitted to the producing unit 40.

In the producing unit 40, one or more favorite television program recording reservations for the favorite television programs are produced according to the television program schedule information I1, and the favorite television program recording reservations are registered in the television program recording reservation storing unit 33 (step S305). Therefore, each time a television program signal S2 of the favorite television program corresponding to one favorite television program recording reservation registered in the storing unit 33 is output from the demultiplexing unit 102 to the recording unit 34, the television program signal S2 of the favorite television program is recorded in the recording medium 35 according to the favorite television program recording reservation.

Figure 19:
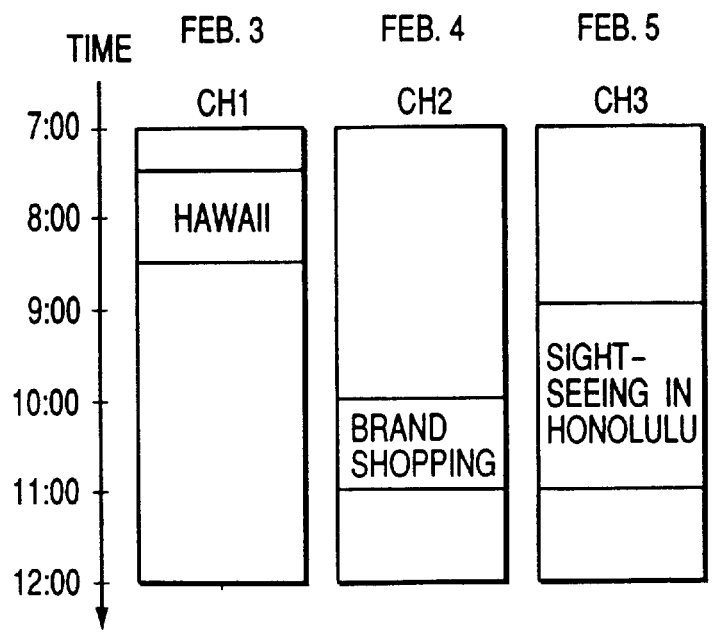
FIG. 19 shows a television program schedule table in which a television program "Hawaii" and a television program "Brand Shopping" corresponding to television program recording reservations manually registered are listed with a television program "Sightseeing in Honolulu" corresponding to a television program recording reservation automatically registered.

An example of the recording reservation producing operation is shown in FIG. 19.

As shown in FIG. 19, in cases where a television program recording reservation for a television program "Hawaii" and a television program recording reservation for a television program "Brand Shopping" are registered or in cases where the television program "Hawaii" and the television program "Brand Shopping" are played back, even though a television program recording reservation for a television program "Sightseeing in Honolulu" is not registered, it is apparent that the viewer desires to watch the television program "Shopping in Honolulu". In this embodiment, because a similarity between a keyword "Hawaii" and a keyword "Honolulu" and a similarity between a keyword "shopping" and a keyword "sightseeing" are high, it is assumed that the television program "Sightseeing in Honolulu" suits a viewer's taste, so that a television program recording reservation for the television program "Sightseeing in Honolulu" is automatically registered.

Accordingly, even though the viewer does not input a television program recording reservation for a favorite television program because the viewer overlooked the favorite television program listed in the television program schedule information I1, when a television program recording reservation for a desired television program is input, because a television program recording reservation for a favorite television program suiting a viewer's taste determined from a plurality of television programs actually watched or planned to be watched by the viewer is automatically produced, the viewer can reliably entertain the favorite television program played back in the television program playing-back unit 36.

In this embodiment, all favorite television program recording reservations produced in the producing unit 40 on condition that any favorite television program recording reservation is not registered in the television program recording reservation storing unit 33 are registered in the storing unit 33 to record all favorite television programs corresponding to the recording reservations. However, it is applicable that all favorite television programs retrieved in the retrieving unit 39 be displayed on a displaying unit for a viewer to select one or more favorite television programs and one or more favorite television program recording reservations for the favorite television programs selected by the viewer be produced and registered.

Also, in this embodiment, the similarity between television programs is determined according to an occurrence frequency of each keyword used in the program information of the television programs. However, it is applicable that the viewer set one or more keywords used for determining the similarity for each television program.

Also, it is applicable that the favorite television program recording reservations be produced in the producing unit 40 in the order of decreasing the similarity degrees of the favorite television program and be registered in the storing unit 33 in that order.

Also, it is applicable that a learning operation be performed according to learning data in a similarity assuming system and the similarity between the viewer's taste and the program feature of each television program listed in the television program schedule information I1 be assumed in the learned similarity assuming system.

In the present invention, a plurality of recording reservations for a plurality of desired television programs overlapping with each other are processed not to overlap with each other in the first embodiment, a lump-sum recording reservation for all specific television programs broadcasted as a television series or as a television serial is automatically registered in the second embodiment, and a recording reservation for a favorite television program suiting a viewer's taste is automatically registered in the third embodiment. However, a concept of the present invention includes the combination of the first, second and third embodiments. For example, in cases where a specific recording reservation for one specific television program automatically produced according to the second embodiment overlaps with a registered recording reservation for one desired television program, it is preferred that the specific recording reservation or the registered recording reservation be changed to another recording reservation for a rebroadcast television program according to the first embodiment. Also, in cases where a recording reservation for a favorite television program automatically produced according to the third embodiment overlaps with a registered recording reservation for one desired television program, it is preferred that the recording reservation for the favorite television program be changed to another recording reservation for a rebroadcast television program according to the first embodiment. Also, it is preferred that a lump-sum recording reservation for all specific television programs broadcasted as a television series or a television serial and a recording reservation for a favorite television program suiting a viewer's taste are automatically registered according to the second and third embodiments.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A television program recording reservation apparatus, comprising:

television program schedule storing means for storing a television program schedule in which a broadcasting schedule of a plurality of television programs including a specific television program is listed, one or more television programs being rebroadcasted;

television program recording reservation receiving means for receiving an input television program recording reservation for a desired television program;

television program recording reservation storing means for storing one or more television program recording reservations for one or more television programs previously received by the television program recording reservation receiving means as one or more registered television program recording reservations;

television program recording reservation overlap judging means for judging whether or not a recording time of the input television program recording reservation received by the television program recording reservation receiving means overlaps with a recording time of each registered television program recording reservation registered in the television program recording reservation storing means;

rebroadcast television program retrieving means for retrieving a rebroadcast desired television program having the same contents as those of the desired television program or a rebroadcast specific television program having the same contents as those of the specific television program from the television program schedule stored in the television program schedule storing means, in cases where it is judged by the television program recording reservation overlap judging means that the recording time of the input television program recording reservation overlaps with a recording time of a specific registered television program recording reservation for the specific television program, on condition that a broadcasting time of the rebroadcast desired television program does not overlap with a recording time of any registered television program recording reservation registered in the television program recording reservation storing means or a broadcasting time of the rebroadcast specific television program does not overlap with a recording time of the input television program recording reservation or a recording time of any registered television program recording reservation other than the specific registered television program recording reservation, a recording time of a television program recording reservation for a television program being the same as a broadcasting time of the television program; and television program recording reservation registration controlling means for producing a rebroadcast television program recording reservation for the rebroadcast desired television program retrieved by the rebroadcast television program retrieving means or a rebroadcast television program recording reservation for the rebroadcast specific television program retrieved by the rebroadcast television program retrieving means according to the television program schedule stored in the television program schedule storing means, and controlling the television program recording reservation storing means to store the rebroadcast television program recording reservation for the rebroadcast desired television program or to store the rebroadcast television program recording reservation for the rebroadcast specific television program in place of the specific registered television program recording reservation for the specific television program, the rebroadcast desired television program or the rebroadcast specific television program being recorded during its broadcasting time and being played back.

2. A television program recording reservation apparatus according to claim 1 in which the rebroadcast desired television program is first retrieved from the television program schedule by the rebroadcast television program retrieving means, and the rebroadcast specific television program is retrieved from the television program schedule by the rebroadcast television program retrieving means in cases where any rebroadcast desired television program is not found.

3. A television program recording reservation apparatus according to claim 1 in which the rebroadcast specific television program is first retrieved from the television program schedule by the rebroadcast television program retrieving means, and the rebroadcast desired television program is retrieved from the television program schedule by the rebroadcast television program retrieving means in cases where any rebroadcast specific television program is not found.

4. A television program recording reservation apparatus according to claim 1 in which the television program recording reservation overlap judging means additionally judges whether or not contents of the desired television program differs from contents of the specific television program in cases where it is judged that the recording time of the input television program recording reservation overlaps with that of the specific registered television program recording reservation for the specific television program, and the input television program recording reservation is registered in the television program recording reservation storing means in place of the specific registered television program recording reservation under the control of the television program recording reservation registration controlling means in cases where it is judged that the desired television program has the same contents as the specific television program.

5. A television program recording reservation apparatus according to claim 1 in which the television program recording reservation overlap judging means additionally judges whether or not contents of the desired television program differs from contents of the specific television program in cases where it is judged that the recording time of the input television program recording reservation overlaps with that of the specific registered television program recording reservation for the specific television program, and the input television program recording reservation is canceled in cases where it is judged that the desired television program has the same contents as the specific television program.

6. A television program recording reservation apparatus according to claim 1 in which each registered television program recording reservation is registered with an importance degree in the television program recording reservation storing means, the input television program recording reservation is received with an importance degree in the television program recording reservation receiving means, a particular television program corresponding to a television program recording reservation having the lower importance degree between the input television program recording reservation and the specific registered television program recording reservation is selected by the rebroadcast television program retrieving means, and a rebroadcast television program having the same contents as those of the particular television program is retrieved from the television program schedule stored in the television program schedule storing means.

7. A television program recording reservation apparatus according to claim 6 in which the importance degree of each television program recording reservation is input with the television program recording reservation to the television program recording reservation receiving means.

8. A television program recording reservation apparatus according to claim 1, further comprising:

television program judging means for judging according to the television program schedule stored in the television program schedule storing means whether or not the desired television program of the input television program recording reservation received by the television program recording reservation receiving means is one of a plurality of particular television programs planned to be broadcasted as a television series or a television serial;

television program series retrieving means for retrieving all the particular television programs of the television series or the television serial from the television program schedule stored in the television program schedule storing means in cases where it is judged by the television program judging means that the desired television program is one of the particular television programs; and television program recording reservation producing means for producing either a television program lump-sum recording reservation for all the particular television programs retrieved by the television program series retrieving means or a particular television program recording reservation for one particular television program different from the desired television program according to the television program schedule stored in the television program schedule storing means, and controlling the television program recording reservation storing means to store the television program lump-sum recording reservation or a set of the input television program recording reservation and the particular television program recording reservation, all the particular television programs or a set of the desired television program and the particular television program being recorded according to the television program lump-sum recording reservation or the set of the input television program recording reservation and being played back.

9. A television program recording reservation apparatus according to claim 1, further comprising:

program information recording means for recording program information of one or more played-back television programs;

favorite television program retrieving means for determining a viewer's taste from the program information of the played-back television programs recorded in the program information recording means, and retrieving one or more favorite television programs, which each differ from any of the registered television programs of the registered television program recording reservations and suit the viewer's taste, from the television program schedule; and television program recording reservation producing means for producing one or more favorite television program recording reservations for the favorite television programs retrieved by the favorite television program retrieving means from the television program schedule stored in the television program schedule storing means and storing the favorite television program recording reservations in the television program recording reservation storing means, the favorite television programs suitable for the viewer's taste being recorded according to the favorite television program recording reservations and being played back.

10. A television program recording reservation apparatus, comprising:

television program schedule storing means for storing a television program schedule in which a broadcasting schedule of a plurality of television programs including first and second television programs is listed, one or more television programs being rebroadcasted;

television program recording reservation receiving means for receiving an input television program recording reservation for a desired television program;

television program recording reservation storing means for storing a plurality of television program recording reservations for a plurality of television programs received by the television program recording reservation receiving means;

television program recording reservation overlap judging means for judging whether or not a recording time of one television program recording reservation overlaps with a recording time of another television program recording reservation for each television program recording reservation registered in the television program recording reservation storing means;

rebroadcast television program retrieving means for retrieving a rebroadcast television program having the same contents as those of a first television program from the television program schedule stored in the television program schedule storing means, in cases where it is judged by the television program recording reservation overlap judging means that a recording time of a first television program recording reservation for the first television program overlaps with a recording time of a second television program recording reservation for a second television program, on condition that a broadcasting time of the rebroadcast television program does not overlap with a recording time of any of the television program recording reservations registered in the television program recording reservation storing means other than the first television program recording reservation, a recording time of a television program recording reservation for a television program being the same as a broadcasting time of the television program; and television program recording reservation producing means for producing a rebroadcast television program recording reservation for the rebroadcast television program retrieved by the rebroadcast television program retrieving means according to the television program schedule stored in the television program schedule storing means, and controlling the television program recording reservation storing means to store the rebroadcast television program recording reservation for the rebroadcast television program in place of the first television program recording reservation for the first television program, the rebroadcast television program being recorded during its broadcasting time and being played back.

11. A television program recording reservation apparatus according to claim 10, further comprising:

television program schedule renewing means for renewing the television program schedule stored in the television program schedule storing means to updated television program schedule, the television program recording reservation storing means changing the television program recording reservations according to the updated television program schedule to make the first and second television program recording reservations overlapping with each other.

12. A television program recording reservation apparatus according to claim 10, further comprising:

television program judging means for judging according to the television program schedule stored in the television program schedule storing means whether or not the desired television program of the input television program recording reservation received by the television program recording reservation receiving means is one of a plurality of specific television programs planned to be broadcasted as a television series or a television serial;

television program series retrieving means for retrieving all the specific television programs of the television series or the television serial from the television program schedule stored in the television program schedule storing means in cases where it is judged by the television program judging means that the desired television program is one of the specific television programs; and second television program recording reservation producing means for producing either a television program lump-sum recording reservation for all the specific television programs retrieved by the television program series retrieving means or a specific television program recording reservation for one specific television program different from the desired television program according to the television program schedule stored in the television program schedule storing means, and controlling the television program recording reservation storing means to store the television program lump-sum recording reservation or a set of the input television program recording reservation and the specific television program recording reservation, all the specific television programs or a set of the desired television program and the specific television program being recorded according to the television program lump-sum recording reservation or the set of the input television program recording reservation and being played back.

13. A television program recording reservation apparatus according to claim 10, further comprising:

program information recording means for recording program information of one or more played-back television programs;

favorite television program retrieving means for determining a viewer's taste from the program information of the played-back television programs recorded in the program information recording means, and retrieving one or more favorite television programs, which each differ from any of the registered television programs of the registered television program recording reservations and suit the viewer's taste, from the television program schedule; and second television program recording reservation producing means for producing one or more favorite television program recording reservations for the favorite television programs retrieved by the favorite television program retrieving means from the television program schedule stored in the television program schedule storing means and storing the favorite television program recording reservations in the television program recording reservation storing means, the favorite television programs suitable for the viewer's taste being recorded according to the favorite television program recording reservations and being played back.

14. A television program recording reservation apparatus, comprising:

television program schedule storing means for storing a television program schedule in which a broadcasting schedule of a plurality of television programs is listed;

television program recording reservation receiving means for receiving an input television program recording reservation for a desired television program;

television program recording reservation storing means for storing one or more television program recording reservations for one or more television programs previously received by the television program recording reservation receiving means as one or more registered television program recording reservations;

television program judging means for judging according to the television program schedule stored in the television program schedule storing means whether or not the desired television program of the input television program recording reservation received by the television program recording reservation receiving means is one of a plurality of specific television programs planned to be broadcasted as a television series or a television serial;

television program series retrieving means for retrieving all the specific television programs of the television series or the television serial from the television program schedule stored in the television program schedule storing means in cases where it is judged by the television program judging means that the desired television program is one of the specific television programs; and television program recording reservation producing means for producing either a television program lump-sum recording reservation for all the specific television programs retrieved by the television program series retrieving means or a specific television program recording reservation for one specific television program different from the desired television program according to the television program schedule stored in the television program schedule storing means, and controlling the television program recording reservation storing means to store the television program lump-sum recording reservation or a set of the input television program recording reservation and the specific television program recording reservation, all the specific television programs or a set of the desired television program and the specific television program being recorded according to the television program lump-sum recording reservation or the set of the input television program recording reservation and being played back.

15. A television program recording reservation apparatus according to claim 14, further comprising:

displaying means for displaying guide information of all the specific television programs retrieved by the television program series retrieving means for a viewer to select the recording of all the specific television programs or the recording of the specific television program different from the desired television program, the television program lump-sum recording reservation for all the specific television programs selected by the viewer or the specific television program recording reservation for the specific television program selected by the viewer being produced by the television program recording reservation producing means.

16. A television program recording reservation apparatus according to claim 14, further comprising:

program information recording means for recording program information of one or more played-back television programs;

favorite television program retrieving means for determining a viewer's taste from the program information of the played-back television programs recorded in the program information recording means, and retrieving one or more favorite television programs, which each differ from any of the registered television programs of the registered television program recording reservations and suit the viewer's taste, from the television program schedule; and second television program recording reservation producing means for producing one or more favorite television program recording reservations for the favorite television programs retrieved by the favorite television program retrieving means from the television program schedule stored in the television program schedule storing means and storing the favorite television program recording reservations in the television program recording reservation storing means, the favorite television programs suitable for the viewer's taste being recorded according to the favorite television program recording reservations and being played back.

17. A television program recording reservation apparatus, comprising:

television program schedule storing means for storing a television program schedule in which a broadcasting schedule of a plurality of television programs and program information of each television program are listed;

television program recording reservation receiving means for receiving a television program recording reservation for a television program;

television program recording reservation storing means for storing one or more television program recording reservations for one or more television programs received by the television program recording reservation receiving means as one or more registered television program recording reservations for registered television programs;

program information recording means for recording program information of one or more played-back television programs;

favorite television program retrieving means for determining a viewer's taste from the program information of the played-back television programs recorded in the program information recording means, and retrieving one or more favorite television programs, which each differ from any of the registered television programs and suit the viewer's taste, from the television program schedule; and television program recording reservation producing means for producing one or more favorite television program recording reservations for the favorite television programs retrieved by the favorite television program retrieving means from the television program schedule stored in the television program schedule storing means and storing the favorite television program recording reservations in the television program recording reservation storing means, the favorite television programs suitable for the viewer's taste being recorded according to the favorite television program recording reservations and being played back.

18. A television program recording reservation apparatus according to claim 17 in which the viewer's taste is determined according to an occurrence frequency of each of keywords used in the program information of the played-back television programs.

19. A television program recording reservation apparatus according to claim 17 in which the viewer's taste determined from the program information of the played-back television programs is a viewer's favorite title word or a viewer's favorite genre.

20. A television program recording reservation apparatus according to claim 17 in which program information of the registered television programs corresponding to the registered television program recording reservations registered in the television program recording reservation storing means is retrieved from the television program schedule of the television program schedule storing means by the favorite television program retrieving means, and the viewer's taste is determined from the retrieved program information of the registered television programs in addition to the program information of the played-back television programs.

21. A television program recording reservation apparatus according to claim 17 in which a program feature of each of television programs, which are listed in the television program schedule and differ from any of the registered television programs, is determined by the favorite television program retrieving means according to an occurrence frequency of each of keywords used in the program information of the television program, a similarity degree between the viewer's taste and the program feature of each television program is estimated, and one or more television programs of higher similarity degrees are selected as the favorite television programs.

22. A television program recording reservation apparatus according to claim 21 in which the favorite television program recording reservations are produced by the television program recording reservation producing means in the order of decreasing the similarity degrees of the favorite television programs and are registered in the television program recording reservation storing means in that order.

23. A television program recording reservation apparatus according to claim 17 in which a program feature of each of television programs, which are listed in the television program schedule and differ from any of the registered television programs, is determined by the favorite television program retrieving means according to an occurrence frequency of each of keywords used in the program information of the television program, a learning operation is performed according to learning data in a similarity assuming system to obtain a learned similarity assuming system, the similarity between the viewer's taste and the program feature of each television program is assumed in the learned similarity assuming system, and one or more television programs of the higher similarity are selected as the favorite television programs.

\* \* \* \* \*

UNITED STATES PATENT AND TRADEMARK OFFICE
CERTIFICATE OF CORRECTION

PATENT NO.   : 6,344,878 B1
DATED        : February 5, 2002
INVENTOR(S)  : Emura It is certified that error appears in the above-identified patent and that said Letters Patent is hereby corrected as shown below:

<u>Title page,</u>
Item [73], -- [73] Assignee:     Matsushita Electric Industrial Co., Ltd., Osaka, (JP) --

Signed and Sealed this

Seventeenth Day of September, 2002

*Attest:*

*Attesting Officer*

JAMES E. ROGAN
*Director of the United States Patent and Trademark Office*